United States Patent
Inoue et al.

(10) Patent No.: US 10,998,568 B2
(45) Date of Patent: May 4, 2021

(54) ELECTROCHEMICAL REACTION SINGLE CELL AND ELECTROCHEMICAL REACTION CELL STACK

(71) Applicant: MORIMURA SOFC TECHNOLOGY CO., LTD., Komaki (JP)

(72) Inventors: Shiro Inoue, Nagoya (JP); Yuko Hisano, Nagoya (JP); Tatsuya Ono, Nagoya (JP)

(73) Assignee: MORIMURA SOFC TECHNOLOGY CO., LTD., Komaki (JP)

(*) Notice: Subject to any disclaimer, the term of this patent is extended or adjusted under 35 U.S.C. 154(b) by 0 days.

(21) Appl. No.: 16/486,310

(22) PCT Filed: Feb. 15, 2018

(86) PCT No.: PCT/JP2018/005193
§ 371 (c)(1),
(2) Date: Aug. 15, 2019

(87) PCT Pub. No.: WO2018/151193
PCT Pub. Date: Aug. 23, 2018

(65) Prior Publication Data
US 2019/0386328 A1   Dec. 19, 2019

(30) Foreign Application Priority Data
Feb. 16, 2017   (JP) .............................. JP2017-026545

(51) Int. Cl.
*H01M 8/00* (2016.01)
*H01M 8/1213* (2016.01)
(Continued)

(52) U.S. Cl.
CPC ........... *H01M 8/1213* (2013.01); *C25B 13/04* (2013.01); *H01M 4/8657* (2013.01);
(Continued)

(58) Field of Classification Search
CPC ............. H01M 8/1213; H01M 8/1253; H01M 8/2432; H01M 4/86; H01M 8/12; H01M 4/8657; C25B 1/04
See application file for complete search history.

(56) References Cited

U.S. PATENT DOCUMENTS

2011/0195343 A1   8/2011  Watts et al.
2011/0305972 A1  12/2011  Kobayashi et al.
(Continued)

FOREIGN PATENT DOCUMENTS

| JP | 2013-041809 A | 2/2013 |
| JP | 2014-026926 A | 2/2014 |
| JP | 2014-60161 A  | 4/2014 |

OTHER PUBLICATIONS

Search Report dated Apr. 3, 2018, issued by the International Searching Authority in International Application No. PCT/JP2018/005193 (PCT/ISA/210).
(Continued)

*Primary Examiner* — Cynthhia H Kelly
*Assistant Examiner* — Monique M Wills
(74) *Attorney, Agent, or Firm* — Sughrue Mion, PLLC

(57) ABSTRACT

An electrochemical reaction single cell including an electrolyte layer containing Zr and at least one of Y, Sc, and Ca, an anode disposed on one side of the electrolyte layer, a cathode containing Sr and Co and disposed on the other side of the electrolyte layer, and an intermediate layer disposed between the electrolyte layer and the cathode. The electrochemical reaction single cell exhibits an interface contact ratio of 25.5% to 68.6%, wherein the interface contact ratio is the ratio of the sum of the lengths of portions containing neither $SrZrO_3$ nor cavities of an interfacial surface of the intermediate layer on the electrolyte layer side to the total length of the interfacial surface. Also disclosed is an electrochemical reaction cell stack including a plurality of
(Continued)

electrochemical reaction single cells, at least one of which is the above described electrochemical reaction single cell.

10 Claims, 18 Drawing Sheets

(51) Int. Cl.
  *H01M 8/2432* (2016.01)
  *C25B 13/04* (2021.01)
  *H01M 4/86* (2006.01)
  *H01M 8/1253* (2016.01)
  *C25B 1/04* (2021.01)
  *H01M 8/124* (2016.01)

(52) U.S. Cl.
  CPC ....... *H01M 8/1253* (2013.01); *H01M 8/2432* (2016.02); *C25B 1/04* (2013.01); *H01M 2008/1293* (2013.01)

(56) References Cited

U.S. PATENT DOCUMENTS

| | | |
|---|---|---|
| 2012/0225368 A1 | 9/2012 | Ohmori |
| 2013/0146469 A1* | 6/2013 | Budaragin ......... G01N 27/4073 205/334 |
| 2014/0322633 A1 | 10/2014 | Seong et al. |
| 2016/0164108 A1 | 6/2016 | Matsuno et al. |

OTHER PUBLICATIONS

Communication dated Nov. 4, 2020, from the European Patent Office in counterpart European Application No. 18754816.9.

Communication dated Nov. 17, 2020, issued by the Korean Intellectual Property Office in corresponding Korean Application No. 10-2019-7023984.

* cited by examiner

| SAMPLE No. | FIRING TEMPERATURE OF CATHODE 114 (°C) | INTERFACE CONTACT RATIO Rc (%) | SZO INTEGRATED VALUE Vs | THICKNESS Ts OF SOLID SOLUTION LAYER 182 (μm) | INITIAL VOLTAGE (V) |
|---|---|---|---|---|---|
| S1 | 1,100 | 37.6 | 6,441 | 0.300 | 0.922 |
| S2 | 1,100 | 30.4 | 8,299 | 0.271 | 0.913 |
| S3 | 1,100 | 26.2 | 9,780 | 0.250 | 0.901 |
| S4 | 1,100 | 45.5 | 5,058 | 0.321 | 0.924 |
| S5 | 1,100 | 55.5 | 3,462 | 0.354 | 0.925 |
| S6 | 1,100 | 65.6 | 743 | 0.470 | 0.905 |
| S7 | 1,100 | 72.7 | 196 | 0.505 | 0.890 |
| S8 | 1,200 | 23.4 | 9,883 | 0.484 | 0.894 |

FIG. 8

| SAMPLE No. | MAXIMUM INTERFACE CONTACT LENGTH Lmax (μm) | INCREASE IN RESISTANCE ΔIR AFTER 200-hr THERMAL TREATMENT ($\Omega cm^2$) | DETERMINATION |
|---|---|---|---|
| S1 | 0.5 | 0.054 | C |
| S2 | 0.4 | 0.080 | C |
| S3 | 0.3 | 0.136 | C |
| S4 | 0.7 | 0.026 | B |
| S5 | 1.0 | 0.014 | A |
| S6 | 1.6 | 0.012 | A |

FIG. 13

ELECTROCHEMICAL REACTION SINGLE CELL AND ELECTROCHEMICAL REACTION CELL STACK

CROSS REFERENCE TO RELATED APPLICATIONS

This application is a National Stage of International Application No. PCT/JP2018/005193 filed on Feb. 15, 2018, claiming priority based on Japanese Patent Application No. 2017-026545 filed on Feb. 16, 2017.

TECHNICAL FIELD

A technique disclosed in the present specification relates to an electrochemical reaction single cell.

BACKGROUND ART

A known type of a fuel cell for generating electricity by utilizing electrochemical reaction between hydrogen and oxygen is a solid oxide fuel cell (hereinafter may be referred to as "SOFC"). A single cell of a fuel cell (hereinafter may be referred to simply as a "single cell"), which is a constitutive unit of SOFC, includes an electrolyte layer containing a solid oxide, a cathode, and an anode such that the cathode and the anode face each other in a predetermined direction (hereinafter referred to as a "first direction") and the electrolyte layer intervenes between these electrodes. The electrolyte layer is formed so as to contain, for example, YSZ (yttria-stabilized zirconia). The cathode formed so as to contain, for example, LSCF (lanthanum strontium cobalt ferrite).

In the single cell, the diffusion of Sr (strontium) contained in the cathode toward the electrolyte layer and the reaction between the diffused Sr and Zr (zirconium) contained in the electrolyte layer cause generation of $SrZrO_3$ (hereinafter may be referred to as "SZO"), which is a substance of high resistance. The generation of SZO increases electric resistance in the first direction, resulting in poor electricity generation performance of the single cell. A known technique for preventing a reduction in electricity generation performance due to the generation of SZO involves disposal of an intermediate layer between the cathode and the electrolyte layer (see, for example, Patent Document 1). The intermediate layer prevents diffusion of Sr from the cathode to the electrolyte layer, thereby preventing generation of SZO. The intermediate layer is formed so as to contain, for example, GDC (gadolinium-doped ceria).

PRIOR ART DOCUMENT

Patent Document

Patent Document 1: Japanese Patent Application Laid-Open (kokai) No. 2014-60161

SUMMARY OF THE INVENTION

Problem to be Solved by the Invention

In the aforementioned conventional technique, a smaller amount of SZO contained in the single cell is more preferred. However, the present inventors have newly found that electricity generation performance cannot be satisfactorily improved by focusing only on the amount of SZO contained in the single cell. Thus, the aforementioned conventional technique has room for improvement in terms of the electricity generation performance of the single cell.

Such a problem is common with an electrolysis single cell, which is a constitutive unit of a solid oxide electrolysis cell (hereinafter may be referred to as "SOEC") for generating hydrogen by utilizing the electrolysis of water. In the present specification, a fuel cell single cell and an electrolysis single cell are collectively referred to as an "electrochemical reaction single cell," Such a problem is also common with electrochemical reaction single cells other than SOFC and SOEC.

The present specification discloses a technique capable of solving the aforementioned problems.

Means for Solving the Problem

A technique disclosed in the present specification can be implemented, for example, in the following modes.

(1) An electrochemical reaction single cell disclosed in the present specification comprises an electrolyte layer containing Zr and at least one of Y, Sc, and Ca, an anode disposed on one side of the electrolyte layer in a first direction, a cathode containing Sr and Co and disposed on the other side of the electrolyte layer in the first direction, and an intermediate layer disposed between the electrolyte layer and the cathode, wherein the electrochemical reaction single cell exhibits an interface contact ratio of 25.5% to 68.6% in at least one cross section parallel to the first direction. The interface contact ratio is the ratio of the sum of the lengths of portions containing neither $SrZrO_3$ nor cavities of an interfacial surface of the intermediate layer on the electrolyte layer side to the total length of the interfacial surface. The interface contact ratio indicates the percentage of electrical contact securing portions (i.e., portions other than electrical contact blocking portions containing $SrZrO_3$ or cavities) of the interfacial surface of the intermediate layer on the electrolyte layer side. When the interface contact ratio is excessively high (i.e., the amount of generated $SrZrO_3$ (SZO) is small), electric resistance due to SZO is reduced, but a solid solution layer formed around the interfacial surface of the intermediate layer on the electrolyte layer side has an excessively large thickness. This causes a very high electric resistance due to the solid solution layer, resulting in an increase in the electric resistance of the electrochemical reaction single cell. In contrast, when the interface contact ratio is excessively low, the solid solution layer has a small thickness, and electric resistance due to the solid solution layer is reduced. However, the intermediate layer has a fragile structure due to many cavities, and the intermediate layer cannot effectively prevent diffusion of Sr from the cathode, whereby a large amount of SZO is generated. This causes a very high electric resistance due to SZO, resulting in an increase in the electric resistance of the electrochemical reaction single cell. In the case where the firing temperature of the cathode is excessively high, when the interface contact ratio is excessively low, a large amount of Sr diffuses from the material of the cathode during firing of the cathode, and thus a large amount of SZO is generated. This causes a very high electric resistance due to SZO, resulting in an increase in the electric resistance of the electrochemical reaction single cell. According to the present electrochemical reaction single cell, the interface contact ratio is 25.5% to 68.6%; i.e., the interface contact ratio is neither excessively high nor excessively low. Thus, the electric resistance of the electrochemical reaction single cell can be reduced, thereby preventing impairment of the performance of the electrochemical reaction single cell.

(2) In the above-described electrochemical reaction single cell, the interface contact ratio may be 30.0% to 64.1% in at least one cross section parallel to the first direction. According to the present electrochemical reaction single cell, since the interface contact ratio is 30.0% to 64.1%; i.e., the interface contact ratio falls within a range that is narrower than the aforementioned range and does not include excessively high and low values, the electric resistance of the electrochemical reaction single cell can be effectively reduced, thereby effectively preventing impairment of the performance of the electrochemical reaction single cell.

(3) In the above-described electrochemical reaction single cell, the interface contact ratio may be 36.4% to 57.8% in at least one cross section parallel to the first direction. According to the present electrochemical reaction single cell, since the interface contact ratio is 36.4% to 57.8%; i.e., the interface contact ratio falls within a range that is narrower than the aforementioned range and does not include excessively high and low values, the electric resistance of the electrochemical reaction single cell can be more effectively reduced, thereby more effectively preventing impairment of the performance of the electrochemical reaction single cell.

(4) The above-described electrochemical reaction single cell may exhibit a maximum interface contact length of 0.3 µm or more in at least one cross section parallel to the first direction in each of three portions of the electrochemical reaction single cell, the three portions being prepared by virtually dividing the electrochemical reaction single cell so that the cathode is equally divided into three parts in a predetermined direction as viewed in the first direction, wherein the maximum interface contact length is the maximum of the lengths of portions containing neither $SrZrO_3$ nor cavities of the interfacial surface of the intermediate layer on the electrolyte layer side. In the case where the maximum interface contact length, which is the maximum of the lengths of portions containing neither $SrZrO_3$ nor cavities (hereinafter the portions may be referred to as "interface contact portions") of the interfacial surface of the intermediate layer on the electrolyte layer side, is small, when SZO generated as a result of the use (operation) of the electrochemical reaction single cell enters the interfacial surface, interface contact portions having a certain length or longer are absent at the interfacial surface, and thus electrical contact becomes poor at the interfacial surface, resulting in impairment of the performance of the electrochemical reaction single cell. According to the present electrochemical reaction single cell, since the maximum interface contact length at the interfacial surface of the intermediate layer on the electrolyte layer side is relatively large (i.e., 0.3 µm or more) in almost the entre electrochemical reaction single cell in the direction perpendicular to the first direction, interface contact portions having a certain length or longer are secured at the interfacial surface even if SZO generated as a result of the use (operation) of the electrochemical reaction single cell enters the interfacial surface. This can prevent impairment of the performance of the electrochemical reaction single cell, which would otherwise occur due to poor electrical contact at the interfacial surface.

(5) In the above-described electrochemical reaction single cell, the maximum interface contact length may be 0.7 µm or more in at least one cross section parallel to the first direction in each of the three portions of the electrochemical reaction single cell. According to the present electrochemical reaction single cell, since the maximum interface contact length at the interfacial surface of the intermediate layer on the electrolyte layer side is larger (i.e., 0.7 µm or more) in almost the entire electrochemical reaction single cell in the direction perpendicular to the first direction, interface contact portions having a certain length or longer are reliably secured at the interfacial surface even if SZO generated as a result of the use (operation) of the electrochemical reaction single cell enters the interfacial surface. This can effectively prevent impairment of the performance of the electrochemical reaction single cell, which would otherwise occur due to poor electrical contact at the interfacial surface.

(6) In the above-described electrochemical reaction single cell, the maximum interface contact length may be 1.0 µm or more in at least one cross section parallel to the first direction in each of the three portions of the electrochemical reaction single cell. According to the present electrochemical reaction single cell, since the maximum interface contact length at the interfacial surface of the intermediate layer on the electrolyte layer side is larger (i.e., 1.0 µm or more) in almost the entire electrochemical reaction single cell in the direction perpendicular to the first direction, interface contact portions having a certain length or longer are more reliably secured at the interfacial surface even if SZO generated as a result of the use (operation) of the electrochemical reaction single cell enters the interfacial surface. This can more effectively prevent impairment of the performance of the electrochemical reaction single cell, which would otherwise occur due to poor electrical contact at the interfacial surface.

In the above-described electrochemical reaction single cell, the electrolyte layer may contain a solid oxide. According to the present electrochemical reaction single cell, impairment of the performance of the electrochemical reaction single cell can be prevented even when an increase in the electric resistance due to deposition of SZO is likely to occur.

(8) The above-described electrochemical reaction single cell may be a fuel cell single cell. According to the present electrochemical reaction single cell, impairment of electricity generation performance can be effectively prevented.

The technique disclosed in the present specification can be implemented in various modes; for example, an electrochemical reaction single cell (fuel cell single cell or electrolysis single cell), an electrochemical reaction cell stack (fuel cell stack or electrolysis cell stack) including a plurality of electrochemical reaction single cells, and a production method therefor.

BRIEF DESCRIPTION OF THE DRAWINGS

FIG. 8 Explanatory table showing the results of performance evaluation.

FIG. 13 Explanatory table showing the results of second performance evaluation.

MODES FOR CARRYING OUT THE INVENTION

A. Embodiment

A-1. Structure

Structure of Fuel Cell Stack 100

Figure 1:
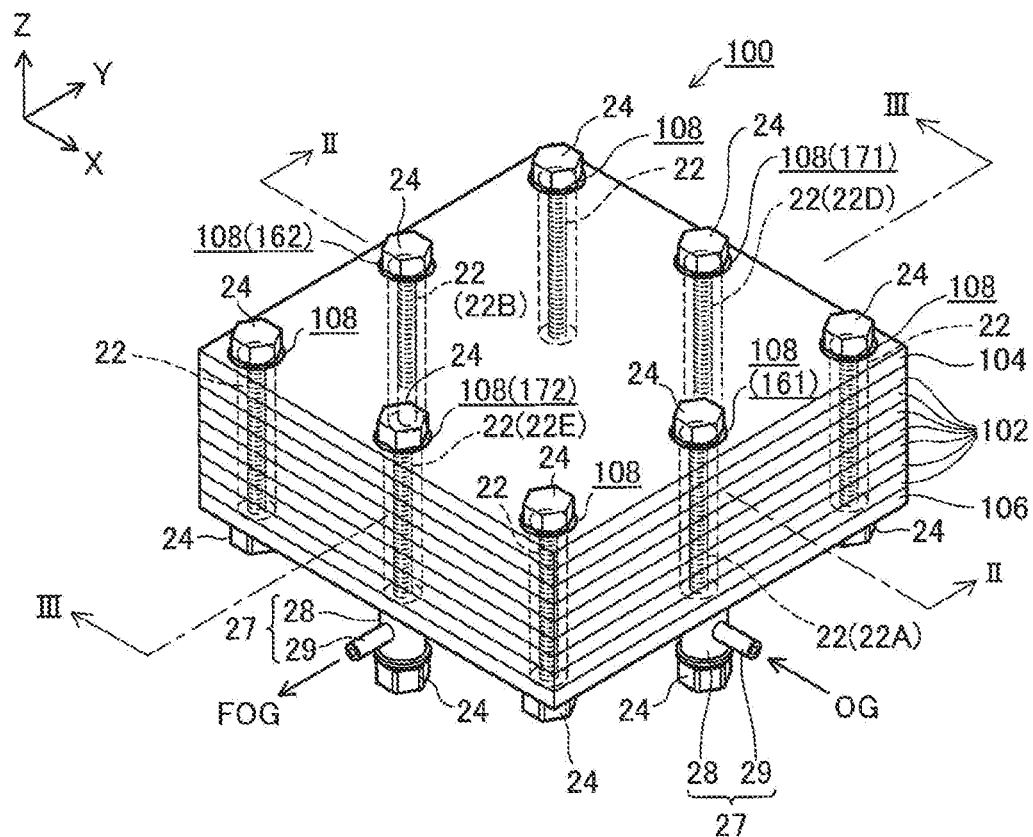
FIG. 1 Perspective view showing the external appearance of a fuel cell stack 100 according to the present embodiment.
Figure 2:
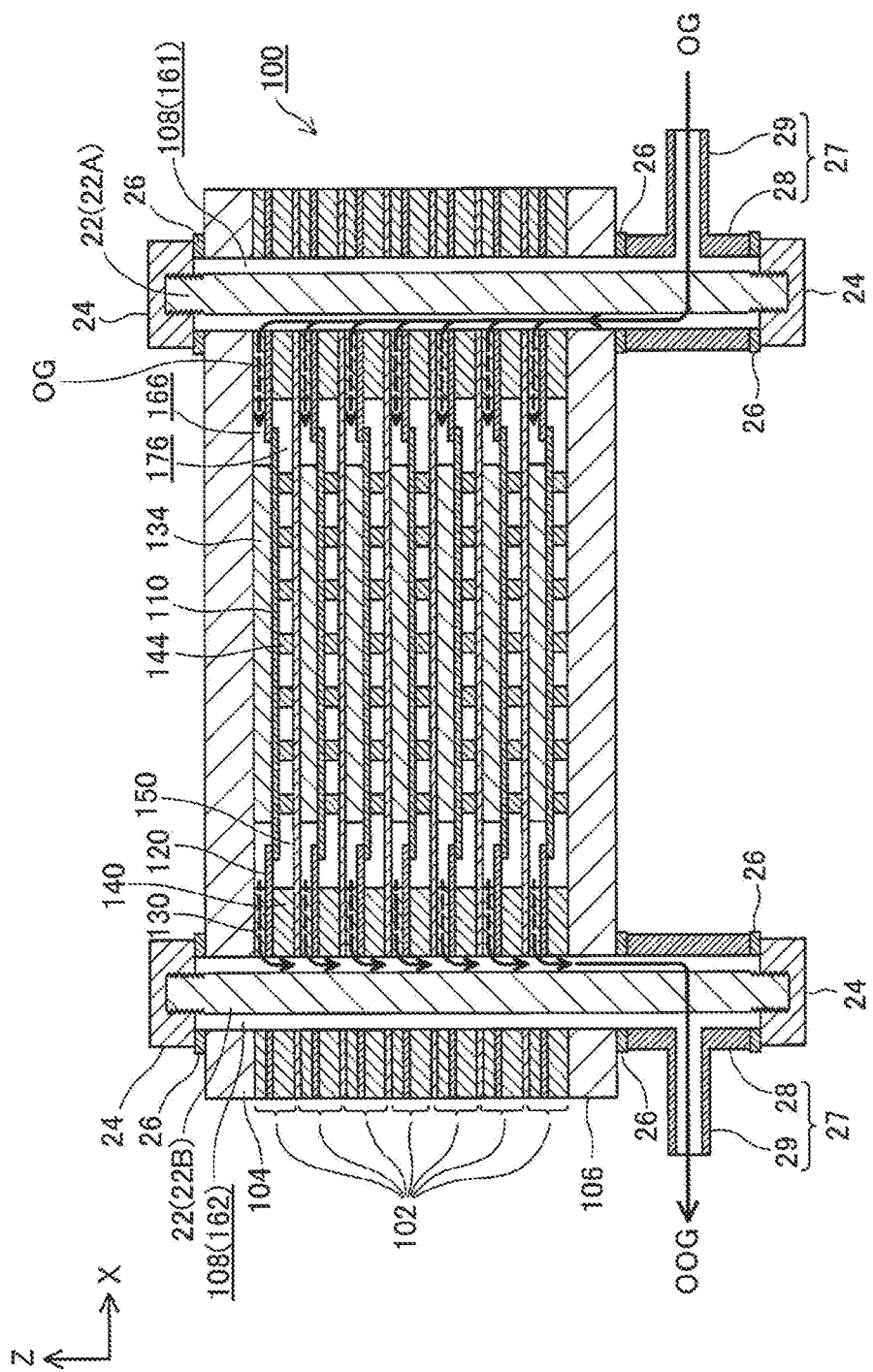
FIG. 2 Explanatory view showing an XZ section of the fuel cell stack 100 taken along line II-II of FIG. 1.
Figure 3:
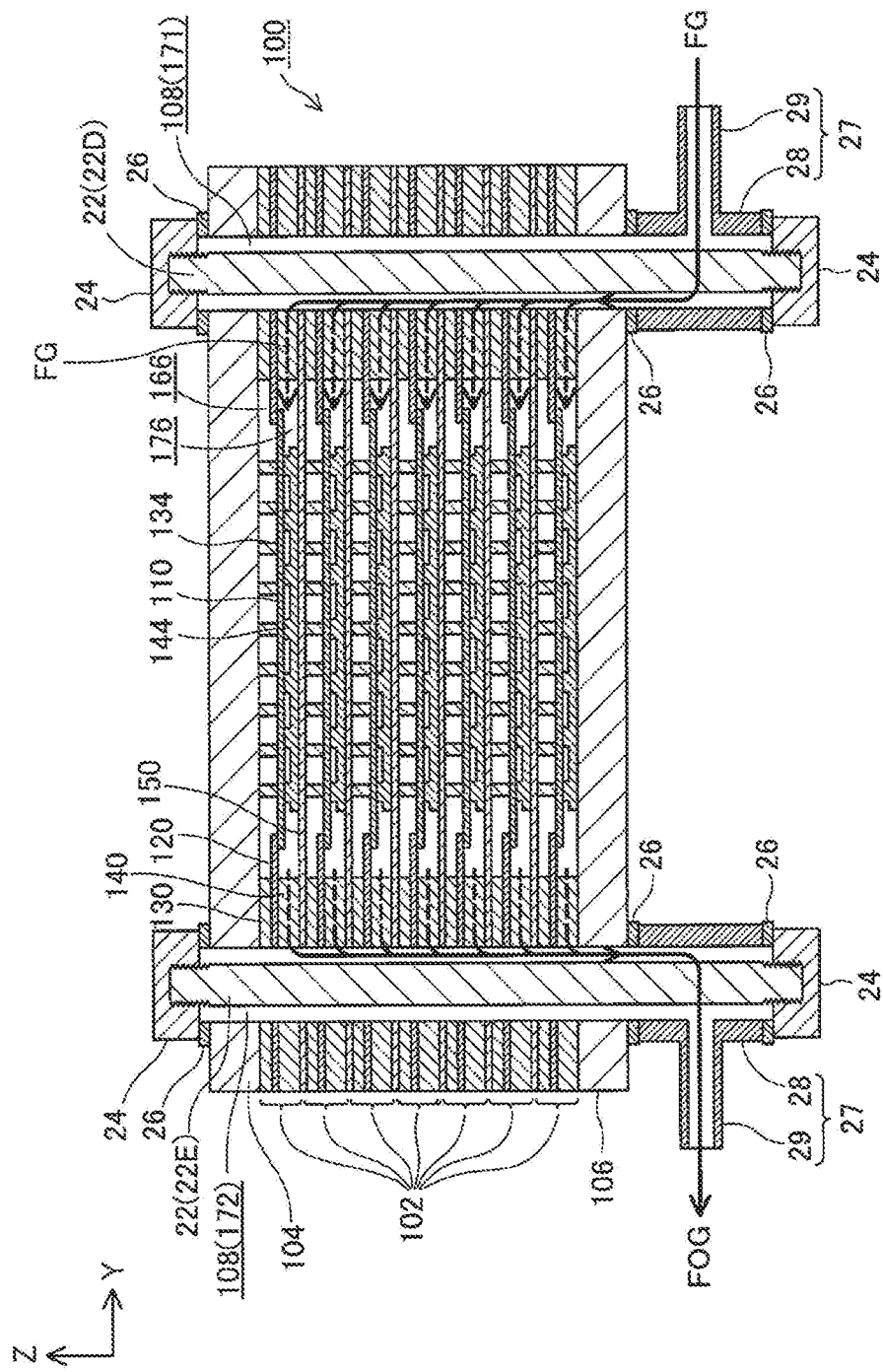
FIG. 3 Explanatory view showing a YZ section of the fuel cell stack 100 taken along line of FIG. 1.

FIG. 1 is a perspective view showing the external appearance of a fuel cell stack 100 according to the present embodiment; FIG. 2 is an explanatory view showing an XZ section of the fuel cell stack 100 taken along line II-II of FIG. 1; and FIG. 3 is an explanatory view showing a YZ section of the fuel cell stack 100 taken along line of FIG. 1. FIGS. 1 to 3 show mutually orthogonal X-axis, Y-axis, and Z-axis for specifying respective directions. In the present specification, for the sake of convenience, the positive Z-axis direction is called the "upward direction" and the negative Z-axis direction is called the "downward direction"; however, in actuality, the fuel cell stack 100 may be disposed in a different orientation. The same also applies to FIG. 4 and subsequent drawings.

The fuel cell stack 100 includes a plurality of (seven in the present embodiment) of electricity generation units 102 and a pair of end plates 104 and 106. The seven electricity generation units 102 are arrayed in a predetermined direction of array (in the vertical direction in the present embodiment). A pair of the end plates 104 and 106 is disposed in such a manner as to hold an assembly of the seven electricity generation units 102 from the upper and lower sides thereof. The direction of array (vertical direction) corresponds to the first direction appearing in CLAIMS.

The fuel cell stack 100 has a plurality (eight in the present embodiment) of holes extending in the vertical direction through peripheral portions about the Z-axis direction of its component layers (the electricity generation units 102 and the end plates 104 and 106). The corresponding holes formed in the layers communicate with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 may be referred to as the "communication holes 108."

Bolts 22 extending in the vertical direction are inserted into the corresponding communication holes 108, and the fuel cell stack 100 is fastened by means of the bolts 22 and nuts 24 engaged with opposite ends of the bolts 22. As shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as a fuel gas introduction manifold 171 into which fuel gas FG is introduced from outside the fuel cell stack 100 and which supplies the fuel gas FG to the electricity generation units 102, whereas a space defined by the bolt 22 (bolt 22E) located at around the midpoint of the other side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

Structure of End Plates 104 and 106

The two end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

Structure of Electricity Generation Unit 102

Figure 4:
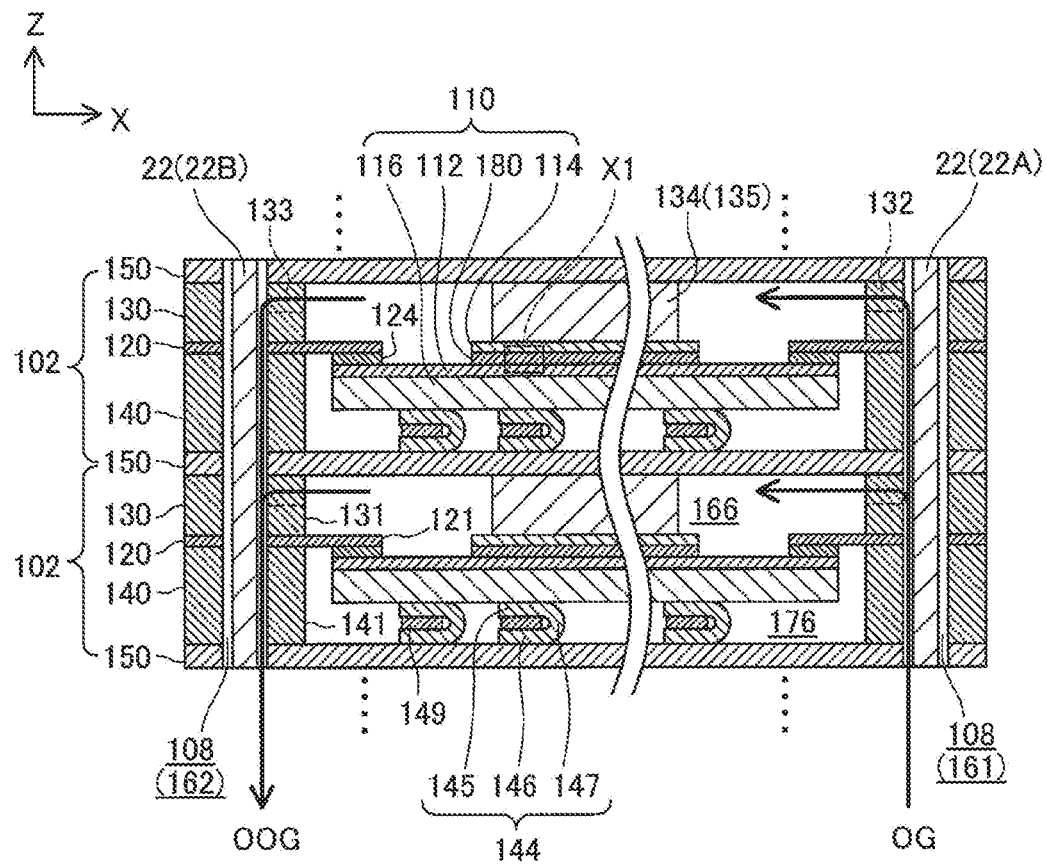
FIG. 4 Explanatory view showing XZ sections of two adjacent electricity generation units 102 at the same position as the section shown in FIG. 2.
Figure 5:
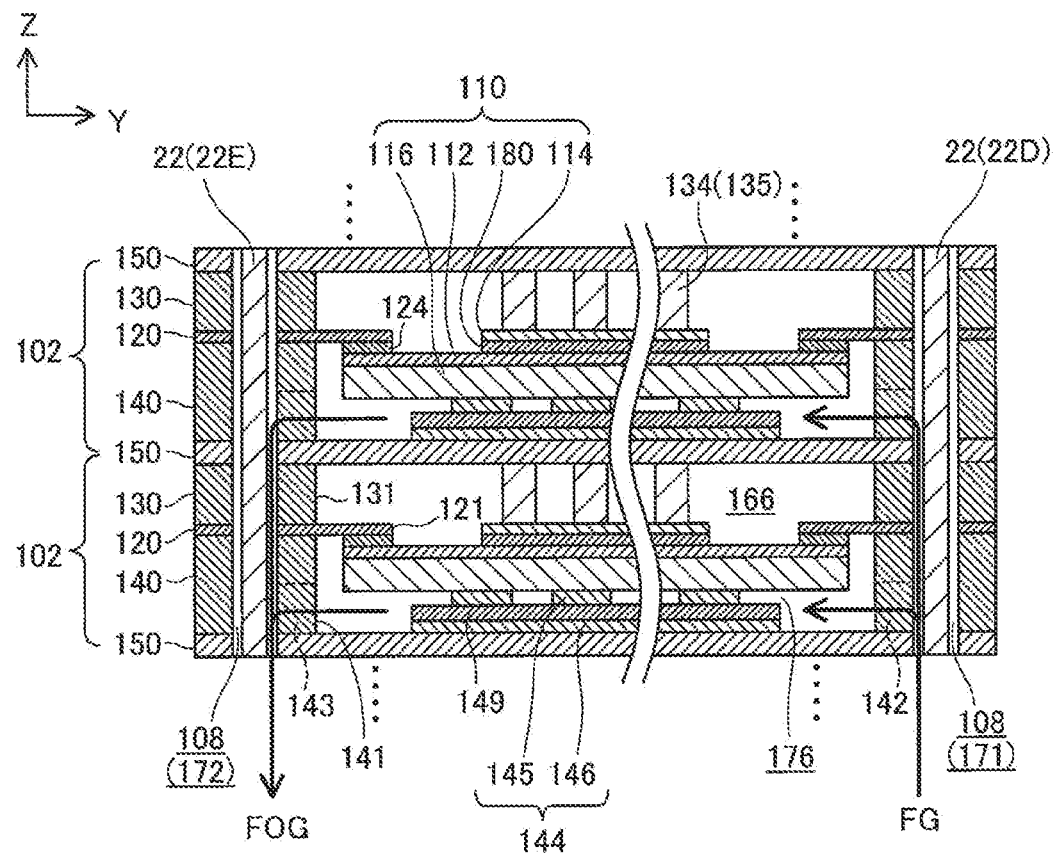
FIG. 5 Explanatory view showing YZ sections of two adjacent electricity generation units 102 at the same position as the section shown in FIG. 3.

FIG. 4 is an explanatory view showing XZ sections of two adjacent electricity generation units 102 at the same position as the section shown in FIG. 2, and FIG. 5 is an explanatory view showing YZ sections of two adjacent electricity generation units 102 at the same position as the section shown in FIG. 3.

As shown in FIGS. 4 and 5, the electricity generation unit 102 includes a single cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150.

The interconnector 150 is an electrically conductive member having an approximately rectangular flat plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity Generation unit 102 does not have the lower interconnector 150 (see FIGS. 2 and 3).

The single cell 110 includes an electrolyte layer 112, an anode 116 disposed on one vertical side (lower side) of the electrolyte layer 112, a cathode 114 disposed on the other vertical side (upper side) of the electrolyte layer 112, and an intermediate layer 180 disposed between the electrolyte layer 112 and the cathode 114. The single cell 110 of the present embodiment is an anode-support-type single cell in which the anode 116 supports the other layers of the single cell 110 (i.e., the electrolyte layer 112, the cathode 114, and the intermediate layer 180).

The electrolyte layer 112 is a member having an approximately rectangular flat-plate shape and is formed so as to contain YSZ (yttria-stabilized zirconia), which is a solid oxide. That is, the electrolyte layer 112 contains Zr (zirconium) and Y (yttrium). The cathode 114 is a member having an approximately rectangular flat-plate shape. In the present embodiment, the cathode 114 includes a current collecting layer 220, and an active layer 210 located on the lower side of the current collecting layer 220 (i.e., on the side toward the electrolyte layer 112) (see FIG. 6). The active layer 210 of the cathode 114 mainly functions as a site of ionization reaction of oxygen contained in the oxidizer gas OG. The active layer 210 is formed so as to contain LSCF (lanthanum strontium cobalt ferrite) and GDC gadolinium-doped ceria) serving as an activation substance. The current collecting layer 220 of the cathode 114 mainly functions as a site of diffusing the oxidizer gas OG supplied from the cathode chamber 166 and collecting electricity obtained through electricity generation reaction. The current collecting layer 220 is formed so as to contain LSCF. That is, the cathode 114 contains Sr (strontium) and Co (cobalt). The anode 116 is a member having an approximately rectangular flat-plate shape and is formed of, for example, Ni (nickel), a cermet of Ni and ceramic powder, or an Ni-based alloy. Thus, the single cell 110 of the present embodiment is a solid oxide fuel cell (SOFC) containing a solid oxide as an electrolyte.

The intermediate layer 180 is a member having an approximately rectangular flat-plate shape and is formed so as to contain GDC (gadolinium-doped ceria) and YSZ. The intermediate layer 180 prevents generation of SZO of high resistance caused by reaction between Sr diffused from the cathode 114 and Zr contained in the electrolyte layer 112. The structure of a portion around the intermediate layer 180 in the single cell 110 will be detailed below.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface of the electrolyte layer 112 on the cathode 114 side. The separator 120 is bonded to the electrolyte layer 112 (single cell 110) by means of a bonding layer 124 formed of a brazing material (e.g., Ag brazing material) and disposed between the facing portion of the separator 120 and the electrolyte layer 112. The separator 120 separates the cathode chamber 166 which faces the cathode 114, and the anode chamber 176 which faces the anode 116, from each other, thereby preventing gas leakage from one electrode side to the other electrode side at a peripheral portion of the single cell 110.

The cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface of the separator 120 on the side opposite the electrolyte layer 112 and with a peripheral portion of the surface of the interconnector 150 on the side toward the cathode 114. The cathode-side frame 130 electrically insulates the two interconnectors 150 included in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162.

The anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface of the separator 120 on the side toward the electrolyte layer 112 and with a peripheral portion of the surface of the interconnector 150 on the side toward the anode 116. Also, the anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

The anode-side current collector 144 is disposed within the anode chamber 176. The anode-side current, collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface of the anode 116 on the side opposite the electrolyte layer 112, and the interconnector facing portion 146 is in contact with the surface of the interconnector 150 on the side toward the anode 116. As described above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. A spacer 149 formed of, for example, mica is disposed between the electrode facing portion 145 and the interconnector facing portion 146. Thus, the anode-side current collector 144 follows the deformation of the electricity generation unit 102 stemming from a temperature cycle and a pressure variation of reaction gas, thereby maintaining good electrical connection between the anode 116 and the interconnector 150 (or the end plate 106) via the anode-side current collector 144.

The cathode-side current collector 134 is disposed within the cathode chamber 166. The cathode-side current collector 134 is composed of a plurality of current collector elements 135 each having an approximately rectangular columnar shape and is formed of, for example, ferritic stainless steel. The cathode-side current collector 134 is in contact with the surface of the cathode 114 on the side opposite the electrolyte layer 112 and with the surface of the interconnector 150 on the side toward the cathode 114. As described above, since the electricity generation unit 102 disposed at the uppermost position in the fuel cell stack 100 does not have the upper interconnector 150, the cathode-side current collector 134 in the uppermost electricity generation unit 102 in contact with the upper end plate 104. Since the cathode-side current collector 134 is thus configured, the cathode-side current collector 134 electrically connects the cathode 114 and the interconnector 150 (or the end plate 104) to each other. In the present embodiment, the cathode-side current collector 134 and the interconnector 150 are integrally formed as a unitary member. That is, a flat-plate-shape portion orthogonal to the vertical direction (Z-axis direction) of the unitary member functions as the interconnector 150, and a plurality of the current collector elements 135 protruding from the flat-plate-shape portion toward the cathode 114 collectively function as the cathode-side current collector 134. The unitary member composed of the cathode-side current collector 134 and the interconnector 150 may be covered with an electrically conductive coating. An electrically conductive bonding layer may be provided between the cathode 114 and the cathode-side current collector 134 for bonding of the cathode 114 to the cathode-side current collector 134.

A-2. Operation of Fuel Cell Stack 100

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the cathode chambers 166 through the oxidizer gas supply communication holes 132 of the electricity generation units 102. Also, as shown in FIGS. 3 and 5, when the fuel gas PG is supplied through a gas pipe (not shown) connected to the branch portion 29 of the gas passage member 27 provided at the position of the fuel gas introduction manifold 171, the fuel gas PG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the single cell 110 generates electricity through the electrochemical reaction between the oxidizer gas OG and the fuel gas FG. The electricity generating reaction is an exothermic reaction. In each electricity generation unit 102, the cathode 114 of the single cell 110 is electrically connected to one interconnector 150 through the cathode-side current collector 134, whereas the anode 116 is electrically connected to the other interconnector 150 through the anode-side current collector 144. Also, a plurality of the electricity Generation units 102 contained in the fuel cell stack 100 are connected electrically in series. Accordingly, electric energy generated in the electricity generation units 102 is output from the end plates 104 and 106 which function as output terminals of the fuel cell stack 100. In the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2 and 4, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

A-3. Specific Structure of Portion Around Intermediate Layer 180 in Single Cell 110

Figure 6:
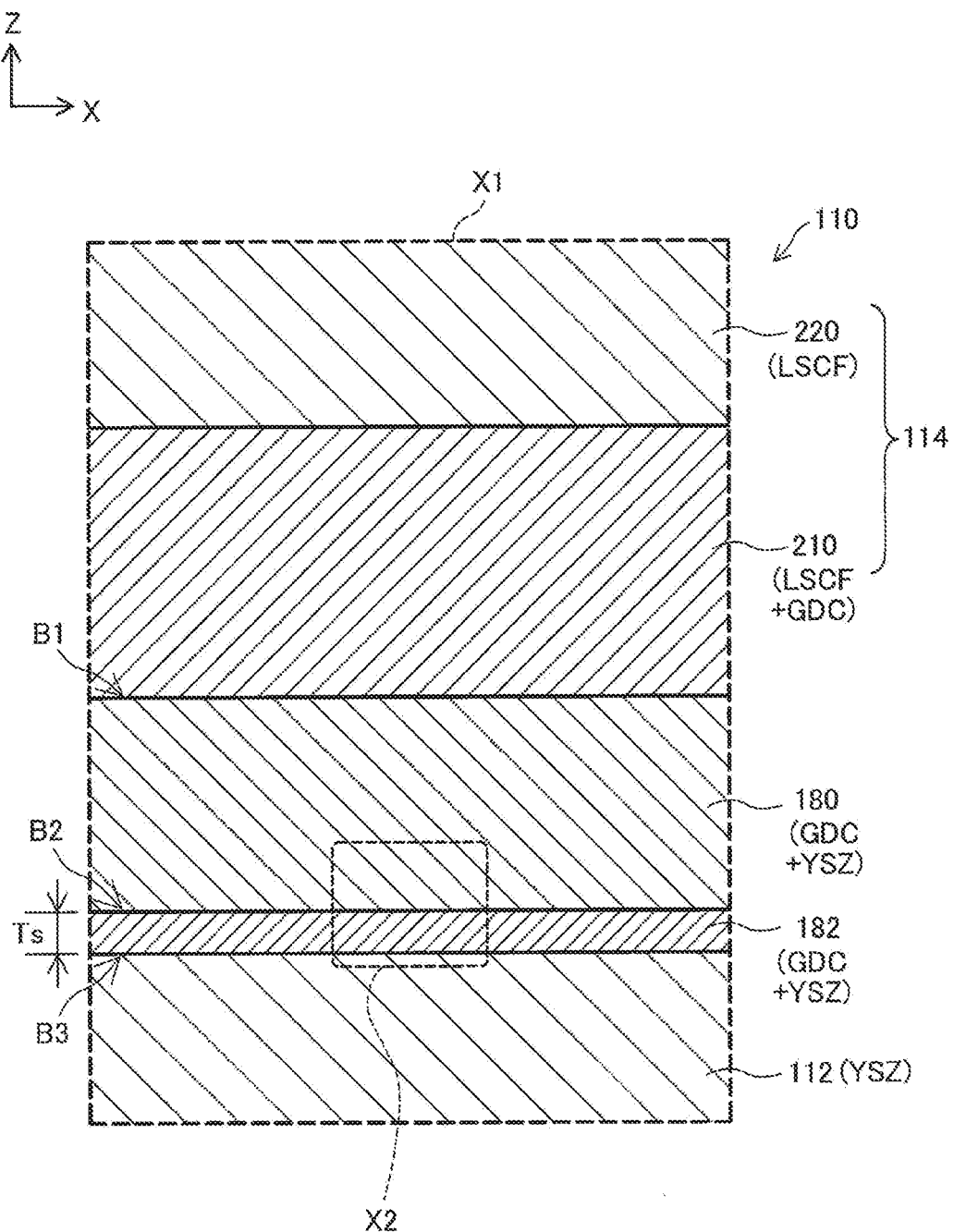
FIG. 6 Explanatory view showing the specific structure of a portion of a single cell 110 around its intermediate layer 180.

FIG. 6 is an explanatory view showing the specific structure of a portion of the single cell 110 around the intermediate layer 180. FIG. 6 illustrates an XZ section of the single cell 110, which shows a region (region X1 in FIG. 4) including a portion of the electrolyte layer 112 and a portion of the cathode 114 with the intermediate layer 180 intervening therebetween.

In the present embodiment, the single cell 110 includes the intermediate layer 180 containing GDC and YSZ and disposed between (the active layer 210) of the cathode 114 containing LSCF and the electrolyte layer 112 containing YSZ. A solid solution layer 182 is present between the intermediate layer 180 and the electrolyte layer 112. The solid solution layer 182 is formed through, for example, interdiffusion between the intermediate layer 180 and the electrolyte layer 112 during firing of the intermediate layer 180. The solid solution layer 182, which is formed through interdiffusion between the intermediate layer 180 and the electrolyte layer 112, contains GDC and YSZ. Thus, the solid solution layer 182 contains Gd (gadolinium), Ce (cerium), and Zr.

In the single cell 110, SZO (i.e., a substance of high resistance) is generated through diffusion of Sr contained in the cathode 114 toward the electrolyte layer 112 and reaction between the diffused Sr and Zr during, for example, firing of the cathode 114 or electricity generation operation. The generation of SZO causes an increase in the electric resistance of the single cell 110, resulting in impairment of electricity generation performance. The intermediate layer 180 prevents diffusion of Sr from the cathode 114 toward the electrolyte layer 112, thereby preventing generation of SZO.

A-4. Performance Evaluation

The single cell 110 forming the fuel cell stack 100 of the present embodiment is characterized in that the interface contact ratio Rc of the intermediate layer 180 on the electrolyte layer 112 side falls within a predetermined range. The interface contact ratio Rc is the ratio of the sum of the lengths of portions containing neither SZO nor cavities (i.e., regions where grains (e.g., YSZ grains) forming the electrolyte layer 112 are in contact with grains (e.g., YSZ and GDC grains) forming the intermediate layer 180) of the interfacial surface of the intermediate layer 180 on the electrolyte layer 112 side to the total length of the interfacial surface (the length in the direction perpendicular to the vertical direction). As shown FIG. 6, the interfacial surface of the intermediate layer 180 on the electrolyte layer 112 side corresponds to the boundary B2 between the intermediate layer 180 and the solid solution layer 182 in the case of the presence of the solid solution layer 182 between the intermediate layer 180 and the electrolyte layer 112, or corresponds to the boundary B3 between the intermediate layer 180 and the electrolyte layer 112 in the case of the absence of the solid solution layer 182 between the intermediate layer 180 and the electrolyte layer 112.

Figure 7:
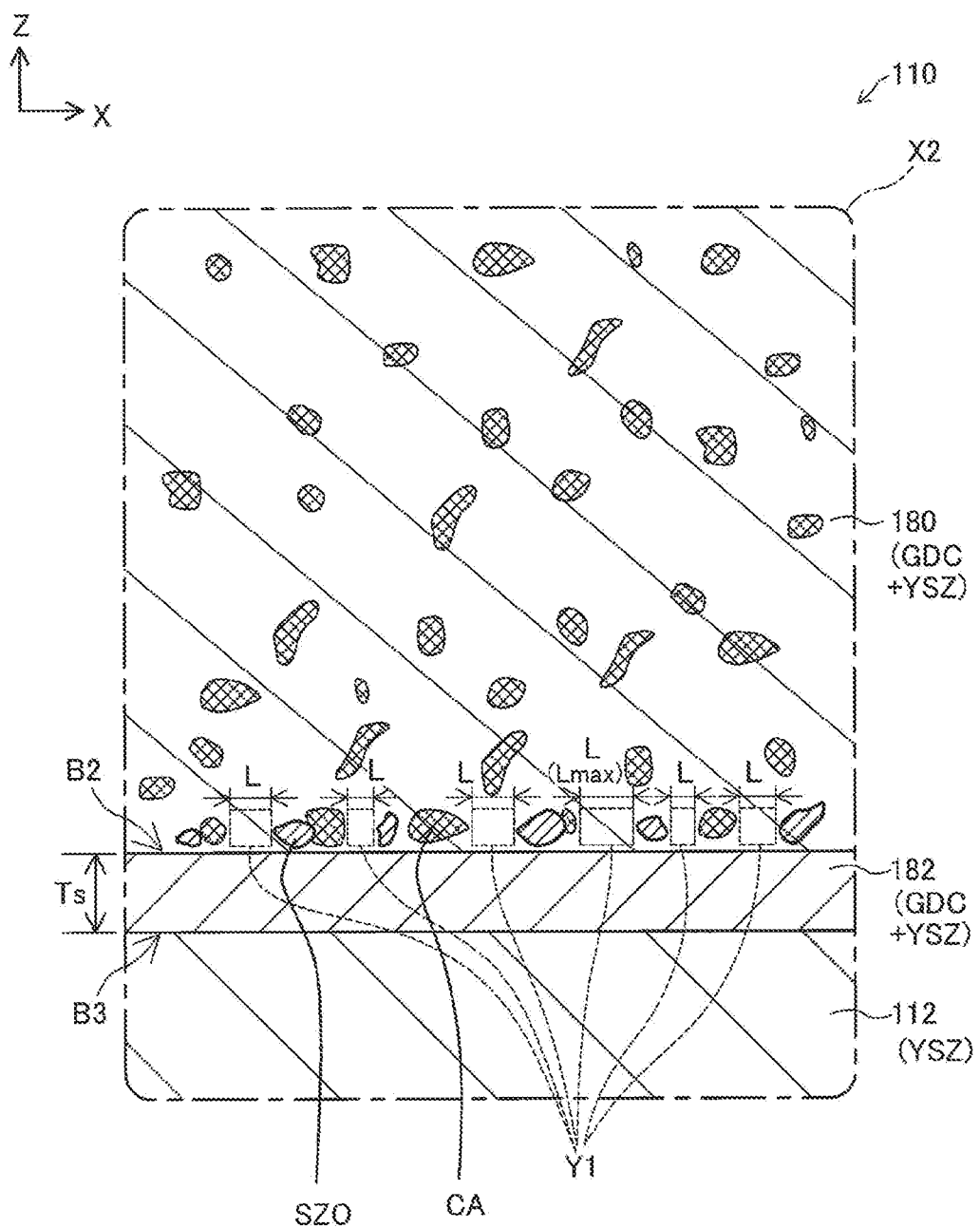
FIG. 7 Explanatory view showing the specific structure of a portion of the single cell 110 around the interfacial surface of the intermediate layer 180 on the electrolyte layer 112 side.

FIG. 7 is an explanatory view showing the specific structure of a portion of the single cell 110 around the interfacial surface of the intermediate layer 180 on the electrolyte layer 112 side. FIG. 7 illustrates an XZ section of the single cell 110, which shows a region (region X2 in FIG. 6) around the interfacial surface of the intermediate layer 180 on the electrolyte layer 112 side. FIG. 7 schematically illustrates SZO grains and cavities CA contained in the intermediate layer 180, but omits illustration of grains (GDC and YSZ grains) forming the intermediate layer 180 and illustration of the internal structures of the solid solution layer 182 and the electrolyte layer 112. In the example shown in FIG. 7, since the solid solution layer 182 is present between the intermediate layer 180 and the electrolyte layer 112, the interfacial surface of the intermediate layer 180 on the electrolyte layer 112 side corresponds to the boundary B2 between the intermediate layer 180 and the solid solution layer 182. The interfacial surface of the intermediate layer 180 on the electrolyte layer 112 side may have portions (regions Y1 in FIG. 7) in which grains forming the electrolyte layer 112 are in contact with grains forming the intermediate layer 180, as well as portions containing cavities CA and portions containing deposited SZO. In the interfacial surface of the intermediate layer 180 on the electrolyte layer 112 side, the interface contact ratio Rc is an index indicating the number of portions which contain neither cavities CA nor SZO and in which grains forming the electrolyte layer 112 are in contact with grains forming the intermediate layer 180.

Next will be described the performance evaluation carried out by using a plurality of samples of the single cell 110. FIG. 8 is an explanatory table showing the results of the performance evaluation. As shown in FIG. 8, the samples (S1 to S8) exhibit different firing temperatures of the cathode 114, different interface contact ratios Rc, different SZO amounts, and different thicknesses Ts of the solid solution layer 182. In the performance evaluation, the amount of SZO contained in the single cell 110 is indicated by "SZO ($SrZrO_3$) integrated value Vs." A larger SZO integrated value Vs indicates a larger amount of SZO contained in the single cell 110. The interface contact ratio Rc, the SZO integrated value Vs, and the thickness Ts of the solid solution layer 182 are calculated as detailed in "A-5. Method for analysis of single cell 110."

A-4-1. Method for Producing Single Cell 110

Each sample of the single cell 110 was produced by the method described below. The performance evaluation involved the use of a plurality of samples of the single cell 110 with different interface contact ratios Rc, different SZO amounts, and different thicknesses Ts of the solid solution layer 182. During production of these samples, the intermediate layer 180 is formed from materials having different specific surface areas, and the intermediate layer 180 is fired at different temperatures. In sample S8, the firing temperature of the cathode 114 is higher than that in the other samples.

Formation of Laminate of Electrolyte Layer 112 and Anode 116

YSZ powder is mixed with a butyral resin, dioctyl phthalate (DOP) serving as a plasticizer, a dispersant, and a solvent mixture of toluene and ethanol by means of a ball mill, to thereby prepare a slurry. The resultant slurry is formed into a thin film by means of doctor blading, to thereby prepare a green sheet for an electrolyte layer having a thickness of, for example, about 10 μm. NiO powder is weighed (55 parts by mass in terms of Ni) and mixed with YSZ powder (45 parts by mass), to thereby prepare a powder mixture. The powder mixture is mixed with a butyral resin, DOP serving as a plasticizer, a dispersant, and a solvent mixture of toluene and ethanol by means of a ball mill, to thereby prepare a slurry. The resultant slurry is formed into a thin film by means of doctor blading, to thereby prepare a green sheet for an anode having a thickness of, for example, 270 μm. The green sheet for an electrolyte layer and the green sheet for an anode are attached together and dried, followed by firing at, for example, 1,400° C., to thereby prepare a laminate of the electrolyte layer 112 and the anode 116.

Formation of Intermediate Layer 180

YSZ powder (8YSZ) is added to GDC powder (Ce:Gd=8:2 (ratio by mole)) so that the Zr content of the intermediate layer 180 falls within a range of 0.015 to 1 (wt %), followed by dispersion mixing by use of highly pure zirconia cobble for 60 hours. This dispersion mixing is performed so that the BET specific surface area of the resultant powder mixture falls within a predetermined value (13 to 23 $m^2/g$) for each sample. A smaller specific surface area of the dispersion-mixed powder leads to higher sinterability. Thus, the resultant sample exhibits a high interface contact ratio Rc between the electrolyte layer 112 and the intermediate layer 180. The powder mixture is mixed with poly(vinyl alcohol) serving as an organic binder and butyl carbitol serving as an organic solvent, and then the viscosity of the mixture is adjusted, to thereby prepare a paste for an intermediate layer. The paste for an intermediate layer is applied, by means of screen printing, onto the surface of the electrolyte layer 112 of the aforementioned laminate (composed of the electrolyte layer 112 and the anode 116), followed by firing at a predetermined temperature of 1,100° C. to 1,400° C. for each sample. Thus, the intermediate layer 180 is formed to thereby prepare a laminate of the intermediate layer 180, the electrolyte layer 112, and the anode 116. A higher firing temperature of the intermediate layer 180 leads to higher sinterability. Thus, the resultant sample exhibits a high interface contact ratio Rc at the interfacial surface of the intermediate layer 180 on the electrolyte layer 112 side. During the firing of the intermediate layer 180, interdiffusion occurs between the intermediate layer 180 and the electrolyte layer 112, to thereby form the solid solution layer 182 between the intermediate layer 180 and the electrolyte layer 112.

Formation of Cathode 114

LSCF powder, GDC powder, alumina powder, poly(vinyl alcohol) serving as an organic binder, and butyl carbitol serving as an organic solvent are mixed together, and the viscosity of the mixture is adjusted, to thereby prepare a paste for a cathode active layer. The paste for a cathode active layer is applied, by means of screen printing, onto the surface of the intermediate layer 180 of the aforementioned laminate (composed of the intermediate layer 180, the electrolyte layer 112, and the anode 116) and then dried. LSCF powder, alumina powder, poly (vinyl alcohol) serving as an organic binder, and butyl carbitol serving as an organic solvent are mixed together, and the viscosity of the mixture is adjusted, to thereby prepare a paste for a cathode current collecting layer. The paste for a cathode current collecting layer is applied onto the paste for a cathode active layer by means of screen printing and then dried, followed by firing at 1,100° C. for samples S1 to 37, and firing at 1,200° C. for sample S8. Thus, the active layer 210 and the current collecting layer 220 of the cathode 114 are formed. The single cell 110 having the aforementioned structure is produced through the above-described process. An increase in the firing temperature of the cathode 114 leads to an increase in the amount of diffusion of Sr contained in the material of the cathode 114, resulting in an increase in the amount of SZO generated. This causes a decrease in interface contact ratio Rc at the interfacial surface of the intermediate layer 180 on the electrolyte layer 112 side in the resultant sample.

Figure 9:
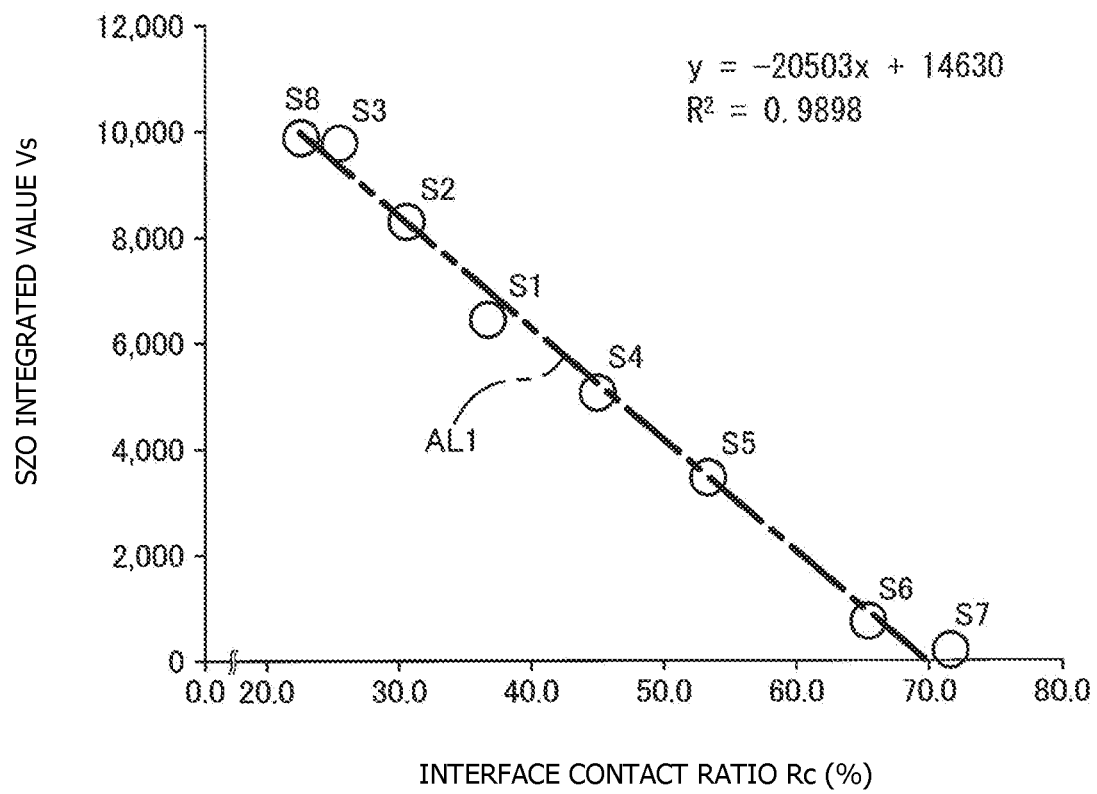
FIG. 9 Explanatory graph showing the relationship between interface contact ratio Rc and SZO integrated value Vs in samples.

FIG. 9 is an explanatory graph showing the relationship between interface contact ratio Rc and SZO integrated value Vs in samples. FIG. 9 illustrates points indicating the relationship between interface contact ratio Rc and SZO integrated value Vs in samples, and an approximate straight line AL1 calculated on the basis of all the points. In FIG. 9, reference numerals (S1 to S8) provided around these points specify the corresponding samples (the same shall apply in FIGS. 10 and 11). As shown in FIGS. 8 and 9, a sample with a smaller SZO integrated value Vs exhibits a higher interface contact ratio Rc. As described above, the interface contact ratio Rc is an index indicating the number of portions which contain neither cavities CA nor SZO and in which grains forming the electrolyte layer 112 are in contact with grains forming the intermediate layer 180 in the interfacial surface of the intermediate layer 180 on the electrolyte layer 112 side. Thus, a decrease in the amount of SZO leads to an increase in the number of portions in which grains forming the electrolyte layer 112 are in contact with grains forming the intermediate layer 180. This probably causes an increase in interface contact ratio Rc.

Figure 10:
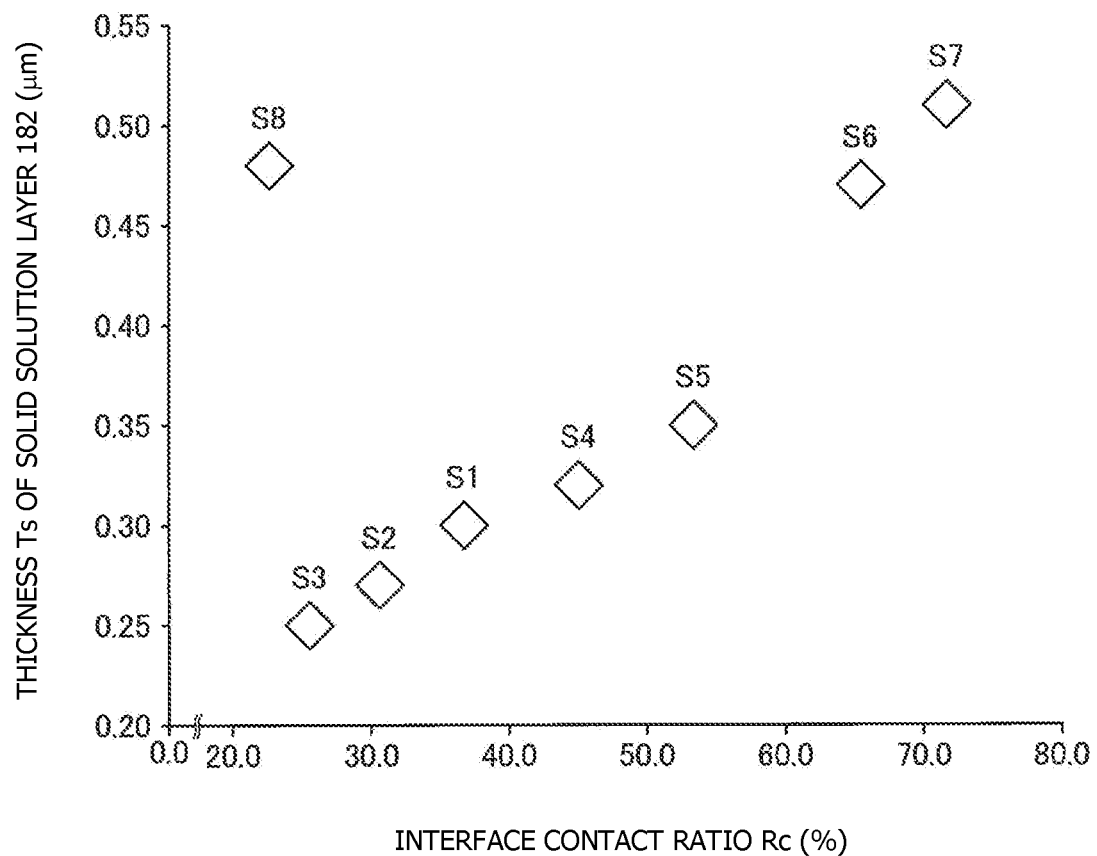
FIG. 10 Explanatory graph showing the relationship between interface contact ratio Rc and the thickness Ts of a solid solution layer 182 in samples.

FIG. 10 is an explanatory graph showing the relationship between interface contact ratio Rc and the thickness Ts of the solid solution layer 182 in samples. FIG. 10 illustrates points indicating the relationship between interface contact ratio Rc and the thickness Ts of the solid solution layer 182 in samples. As shown in FIGS. 8 and 10, in samples S1 to S7, the higher the interface contact ratio Rc, the larger the thickness Ts of the solid solution layer 182. The reason for this is probably as follows. Since the firing temperature of the intermediate layer 180 is high in a sample exhibiting a high interface contact ratio Rc, the thickness Ts of the solid solution layer 182 increases as a result of active interdiffusion between the intermediate layer 180 and the electrolyte layer 112. The solid solution layer 182 having an increased thickness Ts effectively prevents diffusion of Sr from the cathode 114, thereby preventing generation of SZO. This probably causes an increase in the number of portions in which grains forming the electrolyte layer 112 are in contact with grains forming the intermediate layer 180, resulting in an increase in interface contact ratio Rc. In contrast, sample S8 exhibits the lowest interface contact ratio Rc among all the samples, but exhibits a relatively large thickness Ts of the solid solution layer 182. In sample S8, the interface contact ratio Rc is low because of low firing temperature of the intermediate layer 180. However, since the firing temperature of the cathode 114 is relatively high (see FIG. 8), a large amount of Co (cobalt) diffuses from the material of the cathode 114 during firing of the cathode 114, and Co serving as a sintering aid causes abnormal sintering of the intermediate layer 180. This probably results in an increase in the thickness Ts of the solid solution layer 182. Sample S8 exhibits a large SZO integrated value Vs (see FIGS. 8 and 9). This is probably attributed to the fact that a relatively high firing temperature of the cathode 114 causes an increase in the amount of Sr diffused from the material of the cathode 114, to thereby increase the amount of SZO generation.

A-4-2. Evaluation Methods and Evaluation Results

The present performance evaluation involved examination of the electricity generation performance of the single cell 110. The initial voltage of each sample of the single cell 110 was measured at a current density of 0.55 A/cm$^2$ under the following conditions: temperature: 700° C., atmosphere: hydrogen (320 mL), and dew-point temperature: 30° C.

Figure 11:
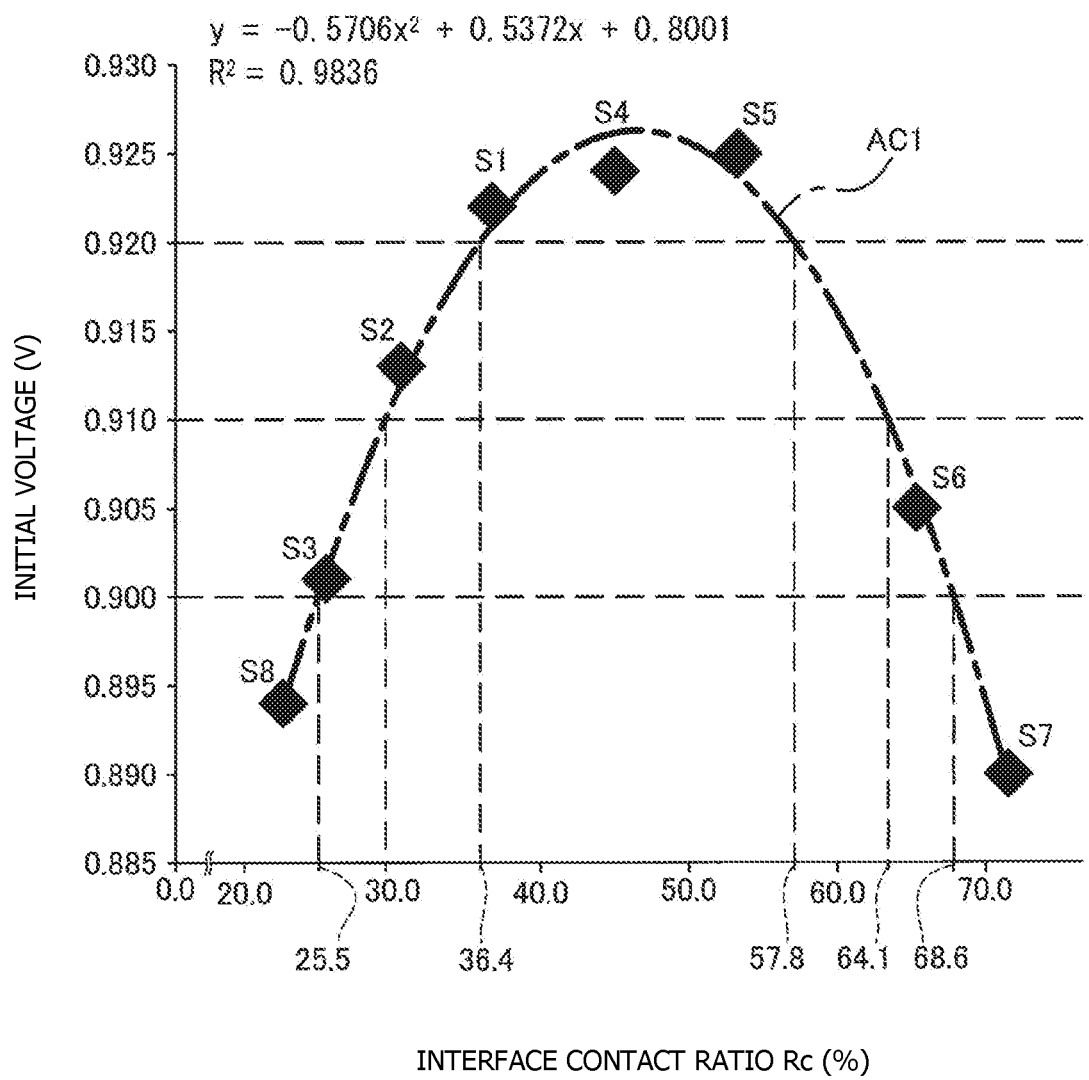
FIG. 11 Explanatory graph showing the relationship between interface contact ratio Rc and initial voltage in samples.

FIG. 11 is an explanatory graph showing the relationship between interface contact ratio Rc and initial voltage in samples. FIG. 11 illustrates points indicating the relationship between interface contact ratio Rc and initial voltage in samples, and a quadratic approximate curve AC1 calculated on the basis of all the points. As shown in FIGS. 8 and 11, the initial voltage is high when the interface contact ratio Rc falls within a specific range, and the initial voltage is low when the interface contact ratio Rc is below or above the specific range. When the interface contact ratio Rc is excessively high (i.e., the amount of generated SZO is small), electric resistance due to SZO is reduced, but the solid solution layer 182 has an excessively large thickness Ts. This probably causes a very high electric resistance due to the solid solution layer 182, resulting in an increase in the electric resistance of the single cell 110. In contrast, when the interface contact ratio Rc is excessively low, the solid solution layer 182 has a small thickness Ts (if the firing temperature of the cathode 114 is the same), and electric resistance due to the solid solution layer 182 is reduced. However, the intermediate layer 180 has a fragile structure due to many cavities CA, and the intermediate layer 180 cannot effectively prevent diffusion of Sr from the cathode 114, whereby a large amount of SZO is generated. This probably causes a very high electric resistance due to SZO, resulting in an increase in the electric resistance of the single cell 110. When the firing temperature of the cathode 114 is excessively high and the interface contact ratio Rc is excessively low (in the case of sample S8), a large amount of Sr diffuses from the material of the cathode 114, and thus a large amount of SZO is generated. This probably causes a very high electric resistance due to SZO, resulting in an increase in the electric resistance of the single cell 110.

In the graph (FIG. 11) showing the relationship between interface contact ratio Rc and initial voltage obtained on the basis of the aforementioned results of performance evaluation, intersection points between the approximate curve AC1 prepared on the basis of all the points and each of horizontal lines corresponding to initial voltages of 0.90, 0.91, and 0.92 V indicate the following relations: the initial voltage is 0.90 V or more when the interface contact ratio Rc falls within a range of 25.5% to 68.6%; the initial voltage is 0.91 V or more when the interface contact ratio Rc falls within a range of 30.0% to 64.1%; and the initial voltage is 0.92 V or more when the interface contact ratio Rc falls within a range of 36.4% to 57.8%. Thus, the interface contact ratio Rc preferably falls within a range of 25.5% to 68.6%, since impairment of the electricity generation performance of the single cell 110 can be prevented. The interface contact ratio Rc more preferably fails within a range of 30.0% to 64.1%, since impairment of the electricity generation performance of the single cell 110 can be effectively prevented. The interface contact ratio Rc still more preferably falls within a range of 36.4% to 57.8%, since impairment of the electricity generation performance of the single cell 110 can be more effectively prevented.

When the interface contact ratio Rc falls within the aforementioned preferred range in at least one cross section parallel to the Z-axis direction (first direction) in one single cell 110, impairment of the electricity generation performance of the single cell 110 can be prevented. When the interface contact ratio Pc falls within the aforementioned preferred range in five or more of, for example, any ten cross sections parallel to the Z-axis direction (first direction) in one single cell 110, impairment of the electricity generation performance of the single cell 110 can be effectively prevented, which is preferred. When the interface contact ratio Rc falls within the aforementioned preferred range in eight or more of any ten cross sections parallel to the Z-axis direction (first direction) in one single cell 110, impairment of the electricity generation performance of the single cell 110 can be more effectively prevented, which is more preferred.

A-4-3. Second Performance Evaluation

Figure 12:
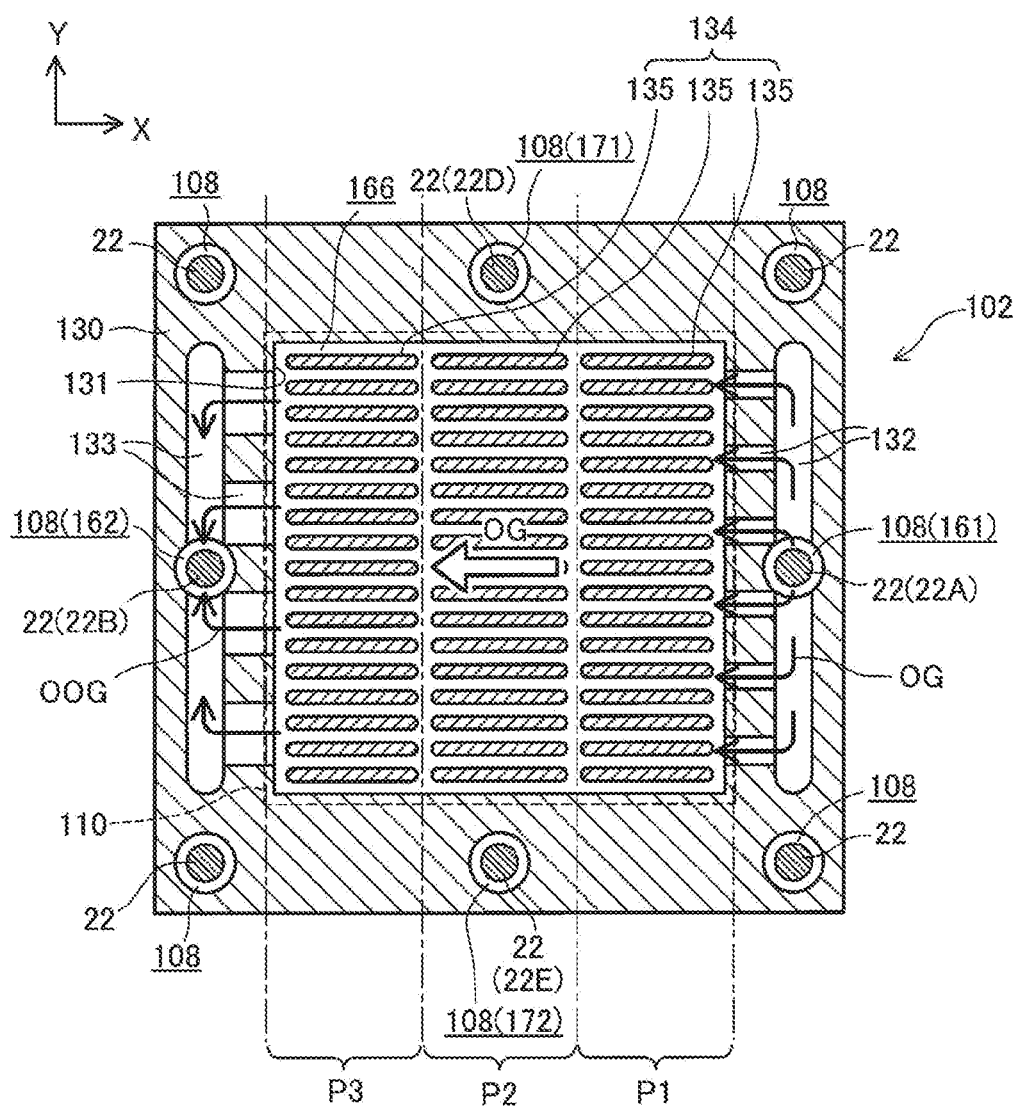
FIG. 12 Explanatory view showing a method for virtual division of the single cell 110.

A plurality of samples of the single cell 110 were used to carry out the second performance evaluation for the maximum interface contact length Lmax of the interfacial surface of the intermediate layer 180 on the electrolyte layer 112 side. As shown in FIG. 7, the maximum interface contact length Lmax is the maximum of the lengths L of portions (e.g., regions Y1 shown in FIG. 7; i.e., regions in which grains (e.g., YSZ grains) forming the electrolyte layer 112 are in contact with grains (e.g., YSZ and GDC grains) forming the intermediate layer 180, hereinafter the portions may be referred to as "interface contact portions") containing neither SZO nor voids (cavities CA) of the interfacial surface (boundary B2) of the intermediate layer 180 on the electrolyte layer 112 side. In the second performance evaluation, the maximum interface contact length Lmax in each sample was defined as follows. Specifically, as shown in FIG. 12, the single cell 110 is virtually divided into three portions P1 to P3 so that the cathode 114 is equally divided into three parts in a predetermined direction (e.g., X-axis direction; i.e., the main flow direction of the oxidizer gas OG) as viewed in the Z-axis direction. One cross section (e.g., YZ section) parallel to the Z-axis direction is appropriately determined in each of the three portions P1 to P3, and the maximum interface contact length Lmax is specified in each of the three cross sections. The minimum of the maximum interface contact lengths Lmax specified in the cross sections was used for evaluation. The maximum interface contact length Lmax in each of the three cross sections is equal to or larger than the maximum interface contact length. Lmax used for the performance evaluation. Thus, it can be said that, over almost the entire region of the single cell 110 in the planar direction, the maximum interface contact length Lmax is equal to or larger than the maximum interface contact length Lmax used for the performance evaluation. The maximum interface contact length Lmax in each cross section is calculated as detailed in "A-5. Method for analysis of single cell 110."

FIG. 13 is an explanatory table showing the results of the second performance evaluation. As shown in FIG. 13, the second performance evaluation involved the use of six samples (samples S1 to S6) exhibiting relatively good results of the performance evaluation for voltage among the samples (samples S1 to S8 of the single cell 110 used for the performance evaluation for initial voltage (FIG. 8). As shown in FIG. 13, the samples exhibit different maximum interface contact lengths Lmax.

The single cell 110 was evaluated for durability in the second performance evaluation. Specifically, each sample of the single cell 110 was thermally treated for 200 hours under the following conditions: temperature: 965° C., atmosphere: air (i.e., conditions for simulating long-term operation at a temperature of 700° C.). Thereafter, the IR resistance of the sample was measured at a current density of 0.55 A/cm² under the following conditions: temperature: 700° C., atmosphere: hydrogen (320 mL), and dew-point temperature: 30° C., to thereby determine an increase in IR resistance ΔIR from the initial state. Rating "excellent (A)" was given in the case where an increase in IR resistance ΔIR was 0.015 Ωcm² or less; rating "good (B)" was given in the case where an increase in IR resistance ΔIR was more than 0.015 Ωcm² and 0.030 Ωcm² or less; rating "fair (C)" was given in the case where an increase in IR resistance ΔIR was more than 0.030 Ωcm² and 0.140 Ωcm² or less; and rating "poor (D)" was given in the case where an increase in IR resistance ΔIR was more than 0.140 Ωcm².

Figure 14:
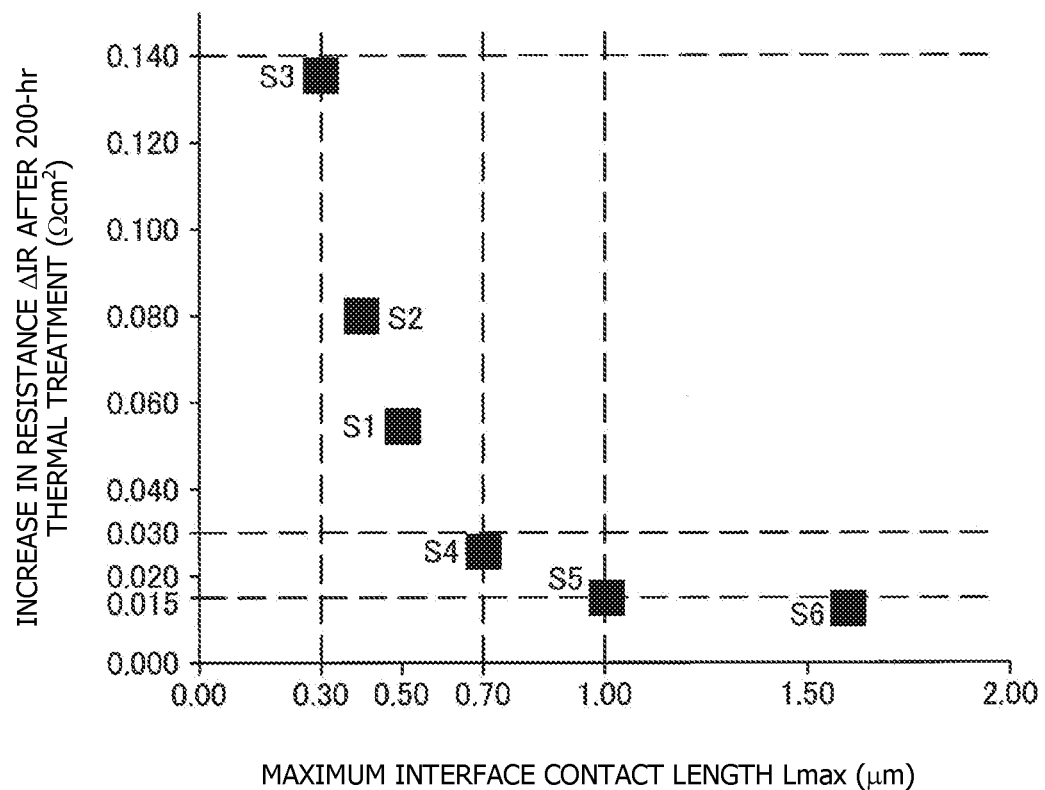
FIG. 14 Explanatory graph showing the relationship between maximum interface contact length Lmax and increase in IR resistance IR after 200-hour thermal treatment in samples.

FIG. 14 is an explanatory graph showing the relationship between maximum interface contact length Lmax and increase in IR resistance ΔIR after 200-hour thermal treatment in samples. As shown in FIGS. 13 and 14, rating "fair (C)" was given to samples S1, S2, and S3 exhibiting a maximum interface contact length Lmax of 0.3 μm or more and less than 0.7 μm, since an increase in IR resistance ΔIR was more than 0.030 Ωcm² and 0.140 μcm² or less, Rating "good (B)" was given to sample S4 exhibiting a maximum interface contact length Lmax of 0.7 μm or more and less than 1.0 μm, since an increase in IR resistance ΔIR was more than 0.0150 Ωcm² and 0.030 Ωcm² or less. Rating "excellent (A)" was given to samples S5 and S6 exhibiting a maximum interface contact length Lmax of 1.0 μm or more, since an increase in IR resistance ΔIR was 0.015 Ωcm² or less.

In all the samples (samples S1 to S6) used for the second performance evaluation, the maximum interface contact length Lmax was 0.3 μm or more, and an increase in IR resistance ΔIR after 200-hour thermal treatment was 0.140 Ωcm² or less (i.e., durability of a certain level or more was achieved). These results are probably obtained for the following reasons. Specifically, Sr contained in the cathode 114 reacts with Zr contained in the electrolyte layer 112 to generate SZO during electricity generation operation of the single cell 110 (fuel cell). The generated SZO enters cavities CA in the intermediate layer 180. When the amount of generated SZO increases as a result of continuation of the electricity generation operation, SZO cannot be accommodated in the cavities CA of the intermediate layer 180 and enters the interfacial surface (boundary B2) of the intermediate layer 180 on the electrolyte layer 112 side. Entrance of SZO into the interfacial surface causes a decrease in the lengths L of portions (interface contact portions) of the interfacial surface in which grains forming the electrolyte layer 112 are in contact with grains forming the intermediate layer 180. However, when the maximum interface contact length Lmax of the interfacial surface is at a certain level or more (specifically 0.3 μm or more) in the initial state, interface contact portions having a certain length L or longer are secured at the interfacial surface even if SZO generated as a result of the electricity generation operation enters the interfacial surface. This can probably prevent an increase in IR resistance (i.e., impairment, of electricity generation performance).

In samples S4 to S6, in which the maximum interface contact length Lmax was 0.7 μm or more at the interfacial surface of the intermediate layer 180 on the electrolyte layer 112 side, an increase in IR resistance ΔIR after 200-hour thermal treatment was 0.030 Ωcm² or less (i.e., high durability was achieved). In these samples, the maximum interface contact length Lmax was larger (specifically 0.7 μm or more) at the interfacial surface in the initial state, interface contact portions having a certain length L or longer were more reliably secured at the interfacial surface even if SZO generated as a result of the electricity generation operation entered the interfacial surface. Conceivably, this effectively prevented an increase in IR resistance (i.e., impairment of electricity generation performance). In particular, in samples S5 and S6, in which the maximum interface contact length Lmax was 1.0 μm or more at the interfacial surface, an increase in IR resistance ΔIR after 200-hour thermal treatment was 0.015 Ωcm² or less (i.e., very high durability was achieved). In these samples, the maximum interface contact length Lmax was larger (specifically 1.0 μm or more) at the interfacial surface in the initial state, interface contact portions having a certain length L or longer were more reliably secured at the interfacial surface even if SZO generated as a result of the electricity generation operation entered the interfacial surface. Conceivably, this more effectively prevented an increase in IR resistance (i.e., impairment of electricity generation performance).

In view of the aforementioned results of the second performance evaluation, the maximum interface contact length Lmax is preferably 0.3 μm or more at the interfacial surface of the intermediate layer 180 on the electrolyte layer 112 side, since impairment of performance as a result of the use (electricity generation operation) of the single cell 110 can be prevented. In particular, the maximum interface contact length Lmax is more preferably 0.7 μm or more at the interfacial surface, since impairment of performance as a result of the use (electricity generation operation) of the single cell 110 can be effectively prevented. The maximum interface contact length Lmax is still more preferably 1.0 μm or more at the interfacial surface, since impairment of performance as a result of the use (electricity generation operation) of the single cell 110 can be much more effectively prevented.

A-5. Method for Analysis of Single Cell 110

A-5-1. Method for Calculation of SZO Integrated Value Vs

Figure 15:
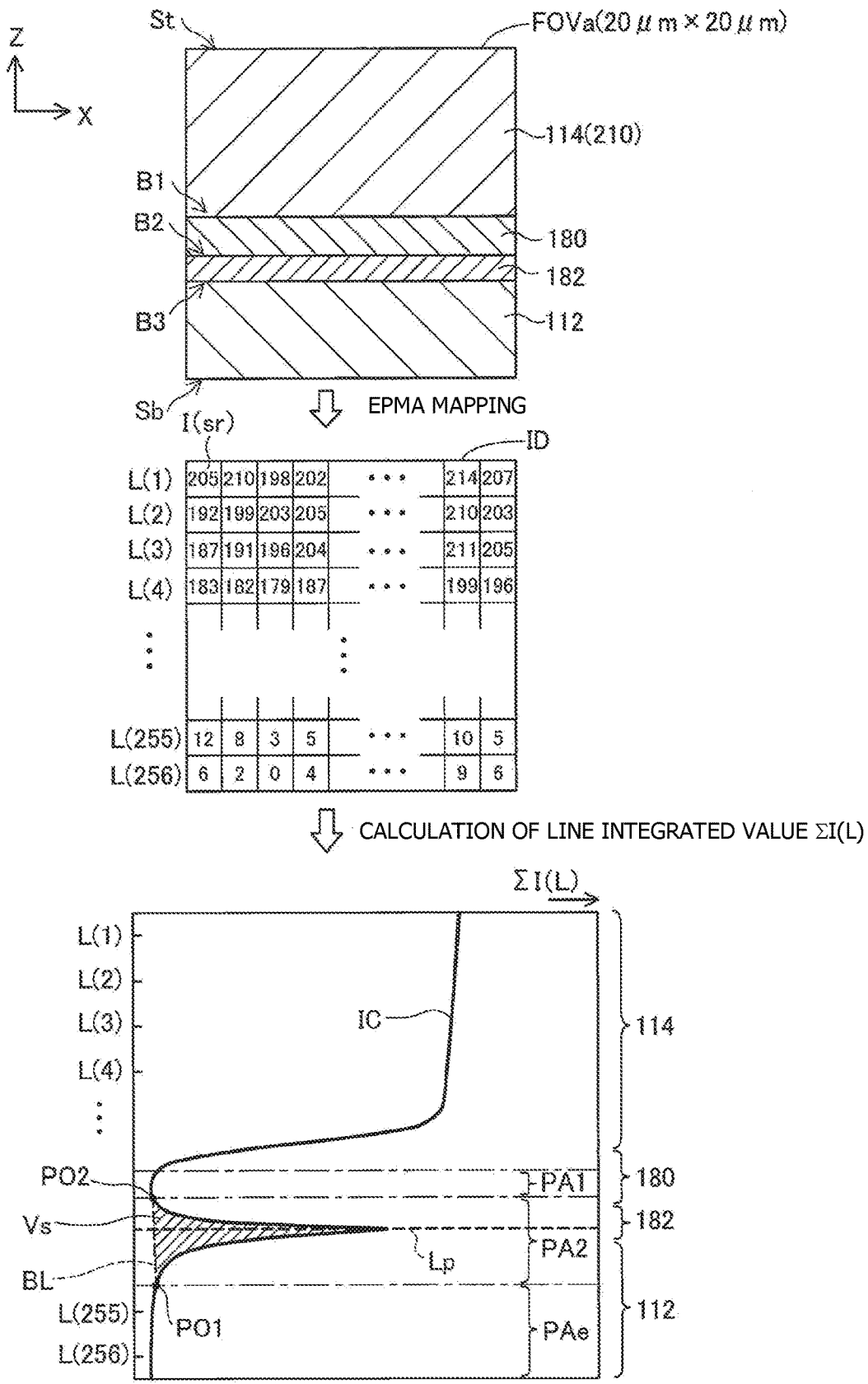
FIG. 15 Explanatory illustration showing a method for calculation of SZO integrated value Vs.

The aforementioned SZO integrated value Vs, which is an index of the amount of SZO, is calculated as described below. FIG. 15 is an explanatory illustration showing a method for calculation of SZO integrated value Vs.

As shown in the upper part of FIG. 15, in the single cell 110 used for calculation of SZO integrated value Vs, a cross section parallel to the Z-axis direction (e.g., an XZ section) is exposed, and a 20 μm×20 μm rectangular field of view FOVa is determined in the exposed cross section. The rectangular field of view FOVa is determined so as to include at least a portion of the cathode 114 in the first direction (Z-axis direction), the intermediate layer 180, and at least a portion of the electrolyte layer 112 in the first direction (Z-axis direction) (i.e., so as to include the boundary B1 between the cathode 114 and the intermediate layer 180 and the boundary B3 of the electrolyte layer 112 on the intermediate layer 180 side). Also, the rectangular field of view FOVa is determined such that two sides (top side St and bottom side Sb) of the four sides forming the rectangular field of view FOVa are approximately parallel to the boundary B3 of the electrolyte layer 112 on the intermediate layer 180 side. As used herein, the term "approximately parallel" refers to the case where two lines (or two faces) form an angle X ($0° \leq X \leq 90°$) of 2° or less, and the term "approximately orthogonal" refers to the case where two lines (or two faces) form an angle X of 88° or more.

Subsequently, as shown in the middle part of FIG. 15, the rectangular field of view FOVa is divided into 256×256 pixels, and Sr intensity mapping data ID representing Sr intensities I (sr) in the pixels are prepared by means of EPMA (electron probe micro analyzer) mapping. In the EPMA mapping, the peak intensities of Sr characteristic X-rays are measured in count units by means of, for example, FE-EPMA JXA-8500F (manufactured by JEOL Ltd.) (electron beams applied to a measurement sample are accelerated at 15 kV) under the following conditions: irradiation current: 20 nA, mapping area: 20 μm square, 256 pixels×256 pixels. The measuring time for characteristic X-rays is 30 milliseconds in each pixel. PETH is used as a dispersive crystal for isolation of Sr characteristic X-ray.

Subsequently, an Sr intensity line integrated value $\Sigma I(L)$, which is the integrated value of Sr intensities I (sr) in pixels, is calculated in each of 256 pixel lines L(n) (L(1) to L(256)) approximately orthogonal to the 2-axis direction in the Sr intensity mapping data ID. Then, an Sr intensity curve IC exhibiting Sr intensities at different positions in the Z-axis direction is obtained as exemplified in the lower part of FIG. 15, in which the horizontal axis shows the Sr intensity line integrated value $\Sigma I(L)$ and the vertical axis shows the position of each pixel line L(n). The Sr intensity curve IC is obtained by plotting the Sr intensity line integrated value $\Sigma I(L)$ against each pixel line L(n). The Sr intensity curve IC is a curve smoothly connecting 256 points corresponding to the Sr intensity line integrated values $\Sigma I(L)$ of the 256 pixel lines L(n).

As described above, the cathode 114 is formed so as to contain LSCF, and thus the cathode 114 contains Sr in an amount larger than that of Sr contained in the material for forming the electrolyte layer 112 or the intermediate layer 180. Thus, as shown in the lower part of FIG. 15, the Sr intensity line integrated value $\Sigma I(L)$ indicated by the Sr intensity curve IC is large in the cathode 114 position (upper position). In this position, Sr is probably present mainly in the form of LSCF. As described above, the diffusion of Sr contained in the cathode 114 toward the electrolyte layer 112 causes reaction between the diffused Sr and Zr contained in the electrolyte layer 112, to thereby generate SZO. Thus, the Sr intensity line integrated value $\Sigma I(L)$ indicated by the Sr intensity curve IC decreases to a low level from the cathode 114 position toward the electrolyte layer 112 side (lower side), increases again from the low level to a high level, and then decreases from the high level to a low level. Conceivably, Sr is present mainly in the form of SZO in a portion where "the Sr intensity line integrated value increases again from the low level to a high level." Thus, the Sr intensity in this position probably correlates with the amount of SZO. Therefore, the SZO integrated value Vs, which is an index of the amount of SZO, is calculated as described below.

Specifically, an electrolyte layer integrated value portion PAe, a first integrated value portion PA1, and a second integrated value portion PA2 are specified in the Sr intensity curve IC. The electrolyte layer integrated value portion. PAe exhibits the Sr intensity line integrated value $\Sigma I(L)$ of a portion of the electrolyte layer 112 having an approximately uniform and small Sr intensity line integrated value $\Sigma I(L)$. Thus, the electrolyte layer integrated value portion PAe corresponds to a small Sr intensity line integrated value $\Sigma I(L)$ portion (trough) in the lowermost portion of the Sr intensity curve IC shown in the lower part of FIG. 15. The first integrated value portion PA1 exhibits an Sr intensity line integrated value $\Sigma I(L)$ approximately equal to the Sr intensity line integrated value $\Sigma I(L)$ of the electrolyte layer integrated value portion PAe. Thus, the first integrated value portion PA1 corresponds to a small Sr intensity line integrated value $\Sigma I(L)$ portion (trough) at a position (just below the cathode 114) of the Sr intensity curve IC shown in the lower part of FIG. 15. The expression "two Sr intensity line integrated values $\Sigma I(L)$ are approximately equal to each other" refers to the case where one of the Sr intensity line integrated values $\Sigma I(L)$ is 90% to 110% of the other Sr intensity line integrated value $\Sigma I(L)$. The second integrated value portion PA2 is located between the electrolyte layer integrated value portion PAe and the first integrated value portion PA1 and exhibits an Sr intensity line integrated value $\Sigma I(L)$ larger than the Sr intensity line integrated value $\Sigma I(L)$ of the electrolyte layer integrated value portion PAe. Thus, the second integrated value portion PA2 corresponds to a peak portion sandwiched between the two troughs (i.e., the electrolyte layer integrated value portion. PAe and the first integrated value portion PA1) of the Sr intensity curve IC shown in the lower part of FIG. 15.

In the above-specified second integrated value portion PA2, a peak pixel line Lp is specified which is a pixel line L(n) at which the Sr intensity line integrated value $\Sigma I(L)$ is maximum. In the second integrated value portion PA2, a first point PO1 and a second point PO2 are also specified, wherein the first point PO1 corresponds to the minimum Sr intensity line integrated value $\Sigma I(L)$ on the electrolyte layer 112 side with respect to the peak pixel line Lp, and the second point PO2 corresponds to the minimum Sr intensity line integrated value ΣI(L) on the cathode 114 side with respect to the peak pixel line Lp. A straight base line BL is prepared by connecting the first point PO1 and the second point PO2, and the area of a region surrounded by the base line BL and the second integrated value portion PA2 of the Sr intensity curve IC (i.e., a hatched region in the lower part of FIG. 15) is calculated as the SZO integrated value Vs in the rectangular field of view FOVa.

In the aforementioned cross section of the single cell 110, 10 rectangular fields of view FOVa are determined such that they do not overlap with one another, and the SZO integrated value Vs is calculated in each rectangular field of view FOVa as described above. Finally, the average of the SZO integrated values Vs in the rectangular fields of view FOVa is defined as the SZO integrated value Vs of the single cell 110.

A-5-2. Method for Determination of Thickness Ts of Solid Solution Layer 182

Figure 16:
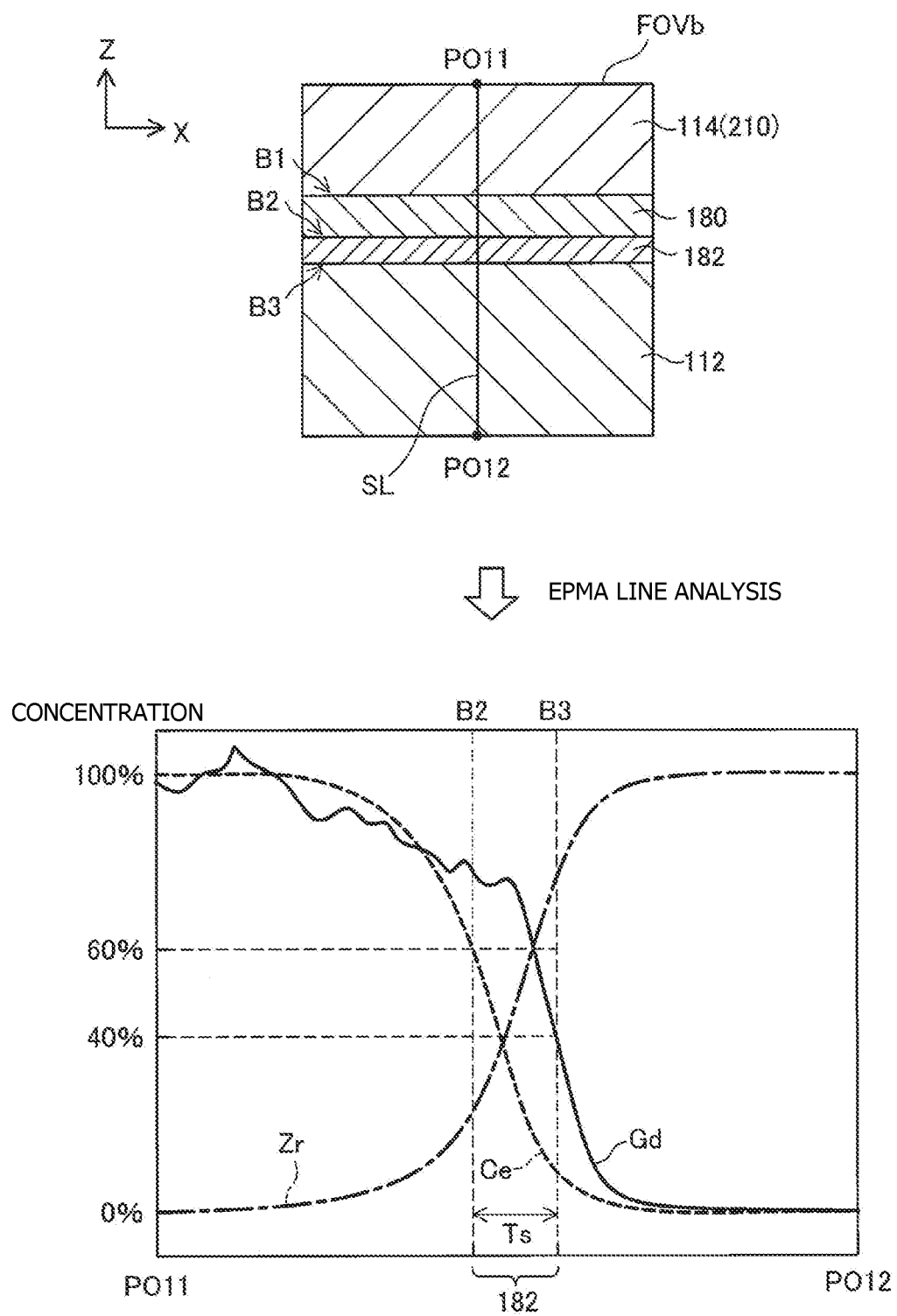
FIG. 16 Explanatory view showing a method for determination of the thickness Ts of the solid solution layer 182.

The thickness Ts of the solid solution layer 182 is determined as described below. FIG. 16 is an explanatory view showing a method for determination of the thickness Ts of the solid solution layer 182.

As shown in the upper part of FIG. 16, in the single cell 110 used for determination of the thickness Ts of the solid solution layer 182, a cross section parallel to the Z-axis direction (e.g., an XZ section) is exposed, and a rectangular field of view FOVb is determined in the exposed cross section. The rectangular field of view FOVb is appropriately determined such that the center of the field of view FOVb is located at a position assumed to be the boundary B3 of the electrolyte layer 112 on the intermediate layer 180 side. In the rectangular field of view FOVb, a line segment SL is determined so as to be approximately orthogonal to the boundary P3, The line segment SL intersects with the outer periphery of the rectangular field of view FOVb. The intersection point on the cathode 114 side (upper side) is called intersection point PO11, and the intersection point on the electrolyte layer 112 side (lower side) is called intersection point PO12.

Subsequently, the line segment SL is divided into 500 pixels, and intensity data exhibiting Gd (or Sm, the same shall apply hereinafter) and Ce intensities in the pixels are prepared by means of EPMA mapping. In the EPMA mapping, the peak intensities of Gd and Ce characteristic X-rays are measured in count units by means of, for example, FE-EPMA JXA-8500F (manufactured by JEOL Ltd.) (electron beams applied to a measurement sample are accelerated at 15 kV) under the following conditions: irradiation current: 20 nA, line length: 3.61 μm, 500 pixels. The measuring time for characteristic X-rays is 500 milliseconds in each pixel. Gd characteristic X-rays are separated by use of LIFH serving as a dispersive crystal, and Ce characteristic X-rays are separated by use of PET serving as a dispersive crystal.

Subsequently, the Gd and Ce intensity data are smoothed (10-point average). In each of the smoothed Gd and Ce intensity data, the average of the intensities in the first to 61st pixels of the 500 pixels on the line segment SL is defined to correspond to a concentration of 100%, and the average of the intensities in the 406th to 491st pixels of the 500 pixels on the line segment SL is defined to correspond to a concentration of 0%. On the basis of this definition, the intensity in each pixel is converted into a concentration.

The lower part of FIG. 16 shows exemplary Gd and Ce concentrations obtained through the conversion. For reference, the lower part of FIG. 16 also shows Zr concentration. In the graph showing the concentrations, the position at which the Ce concentration is 60% is defined as the boundary B2 on the upper side (the intermediate layer 180 side) of the solid solution layer 182, and the position at which the Gd concentration is 40% is defined as the boundary B3 on the lower side (the electrolyte layer 112 side) of the solid solution layer 182. The distance between the boundary B2 and the boundary B3 is determined as the thickness Ts of the solid solution layer 182 in the rectangular field of view FOVb.

In the aforementioned cross section of the single cell 110, 10 rectangular fields of view FOVb are determined such that they do not overlap with one another, and the thickness Ts of the solid solution layer 182 is determined in each rectangular field of view FOVb as described above. Finally, the average of the thicknesses Ts of the solid solution layer 182 in the rectangular fields of view FOVb is defined as the thickness Ts of the solid solution layer 182 of the single cell 110.

A-5-3. Method for Determination of Interface Contact Ratio Rc

Figure 17:
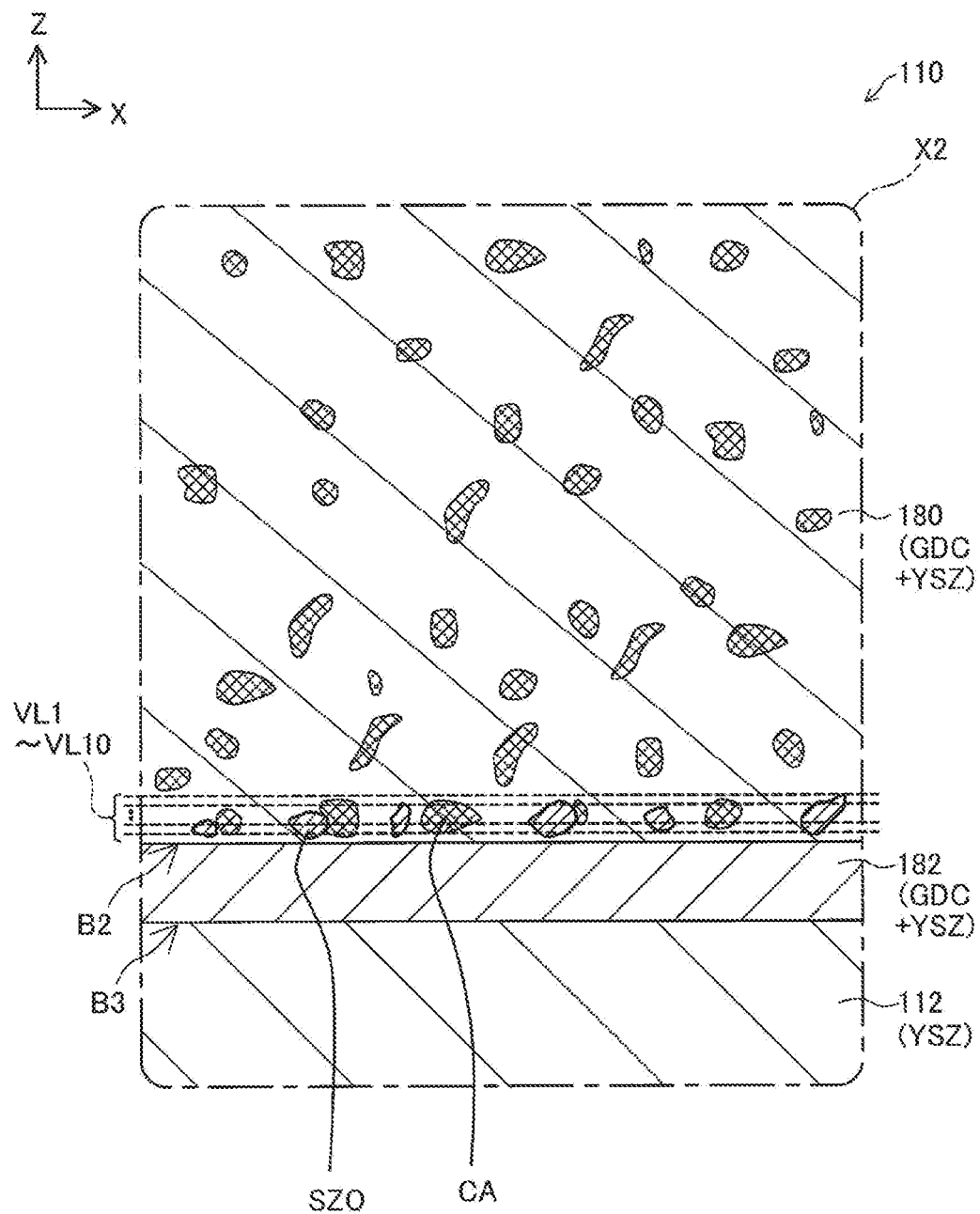
FIG. 17 Explanatory view showing a method for determination of interface contact ratio Rc.

The interface contact ratio Rc is determined by a method described below. FIG. 17 is an explanatory view showing a method for determination of interface contact ratio Rc. Firstly, in the single cell 110 used for determination of interface contact ratio Rc, a cross section parallel to the Z-axis direction (e.g., an XZ section) is exposed, and, at a certain position of the cross section, an SEM image (×5,000) of a portion including the interfacial surface (boundary B2) of the intermediate layer 180 on the electrolyte layer 112 side is obtained by using an FIB-SEM (acceleration voltage: 15 kV). In the SEM image, 10 virtual straight lines VL (VL1 to VL10) perpendicular to the Z-axis direction are provided at intervals of 0.1 μm from the interfacial surface (boundary B2) of the intermediate layer 180 on the electrolyte layer 112 side toward the inside of the intermediate layer 180 (i.e., toward the side away from the electrolyte layer 112). In each of the 10 virtual straight lines VL, portions containing neither SZO nor cavities CA (i.e., portions containing grains forming the intermediate layer 180 or the electrolyte layer 112) are determined. The ratio of the sum of the lengths of the portions containing neither SZO nor cavities CA to the total length of each virtual straight line VL is defined as the interface contact ratio Rc on the virtual straight line VL. The minimum of the interface contact ratios Rc on the virtual straight lines VL is defined as the interface contact ratio Rc of the single cell 110.

Portions containing neither SZO nor cavities CA (i.e., portions containing grains forming the intermediate layer 180 and the electrolyte layer 112) on each virtual straight line VL are determined by a method described below. Sr-detected portions are specified as SZO-corresponding portions by means of EPMA analysis. The aforementioned SEM image is superimposed with an EPMA analysis image, and the resultant image is binarized by using the color of the SZO-corresponding portions as a threshold. Portions having a color different from that of the SZO-corresponding portions are determined as portions containing neither SZO nor cavities CA.

A-5-4. Method for Determination of Maximum Interface Contact Length Lmax in Cross Section of Single Cell 110

The maximum interface contact length Lmax in a cross section of the single cell 110 is determined by a method described below. Specifically, the virtual straight line VL used for determination of the interface contact ratio Rc of the single cell 110 (i.e., the virtual straight line VL on which the interface contact ratio Rc is minimum) in the aforementioned "A-5-3. method for determination of interface contact ratio Rc" is selected in a cross section of the single cell 110. The lengths L of portions containing neither SZO nor voids (cavities CA) (i.e., interface contact portions) are measured in the selected virtual straight line VL, and the maximum of the lengths L of the interface contact portions is defined as the maximum interface contact length Lmax.

B. Modifications

The technique disclosed in the present specification is not limited to the above embodiment, but may be modified into various other forms without departing from the gist thereof. For example, the technique may be modified as described below.

The configuration of the single cell 110 or the fuel cell stack 100 in the above embodiment is a mere example, and may be modified into various forms. For example, in the above embodiment, the cathode 114 has a two-layer structure including the active layer 210 and the current collecting layer 220. However, the cathode 114 may include an additional layer besides the active layer 210 and the current collecting layer 220, or the cathode 114 may have a single-layer structure. In the above embodiment, the number of the single cells 110 included in the fuel cell stack 100 is a mere example and is determined as appropriate in accordance with, for example, a required output voltage of the fuel cell stack 100.

In the above embodiment, materials used for forming the members are provided merely by way of example. Other materials may be used for forming the members. For example, the electrolyte layer 112 contains YSZ in the above embodiment. So long as the electrolyte layer 112 contains Zr and at least one of Y, Sc (scandium), and Ca (calcium), the electrolyte layer 112 may contain, for example, a material such as ScSZ (scandia-stabilized zirconia) or CaSZ (calcium oxide-stabilized zirconia) in place of or in addition to YSZ. In the above embodiment, the cathode 114 (the active layer 210 and the current collecting layer 220) contains LSCF. So long as the cathode 114 contains Sr and Co, the cathode 114 may contain another material in place of or in addition to LSCF. In the above embodiment, the intermediate layer 180 contains GDC and YSZ. The intermediate layer 180 may contain, for example, a material such as SDC (samarium-doped ceria) in place of or in addition to GDC, and may contain, for example, a material such as ScSZ or CaSZ in place of or in addition to YSZ. Since the solid solution layer 182 is formed through interdiffusion between the intermediate layer 180 and the electrolyte layer 112, the material forming the solid solution layer 182 may vary depending on the materials forming the intermediate layer 180 and the electrolyte layer 112. Specifically, the solid solution layer 182 is formed so as to contain at least one of Gd and Sm (samarium), Ce, and Zr.

In the above embodiment, the interface contact ratio Rc does not necessarily fall within the aforementioned preferred range in all the single cells 110 included in the fuel cell stack 100. So long as the interface contact ratio Rc falls within the aforementioned preferred range in at least one single cell 110 included in the fuel cell stack 100, impairment of electricity generation performance can be prevented in the single cell 110.

Figure 18:
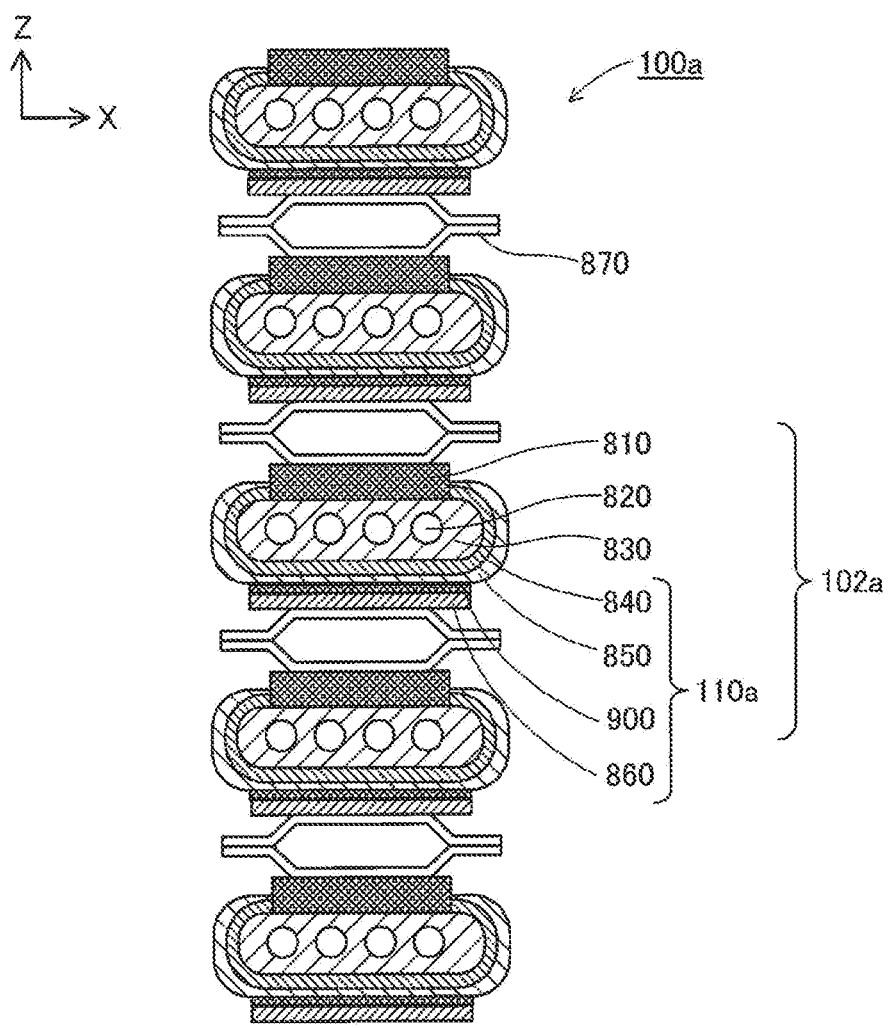
FIG. 18 Explanatory view schematically showing the structure of a fuel cell stack 100a according to a modification.

In the above embodiment, the fuel cell stack 100 includes a plurality of single cells 110 having a flat-plate shape. The present invention is also applicable to another configuration, for example, a fuel cell stack 100a including a plurality of approximately cylindrical single cells 110a as disclosed in International Patent Publication WO 2012/165409. FIG. 18 is an explanatory view schematically showing the structure of a fuel cell stack 100a according to a modification. As shown in FIG. 18, the fuel cell stack 100a according to the modification includes a plurality of electricity generation units 102a disposed at predetermined intervals in the Z-axis direction. The electricity generation units 102a are connected electrically in series through current collecting members 870 each intervening between two adjacent electricity generation units 102a. Each electricity generation unit 102a has a flattened columnar external appearance and includes an electrode support 830, a single cell 110a, and an interconnector 810. The single cell 110a includes an anode 840, an electrolyte layer 850, a cathode 860, and an intermediate layer 900. The Z-axis direction in the modification shown in FIG. 18 corresponds to the first direction appearing in CLAIMS.

The electrode support 830 is a columnar body having an approximately elliptical cross section and is formed of a porous material. The electrode support 830 has in the interior thereof a plurality of fuel gas flow channels 820 extending in the longitudinal direction of the columnar body. The anode 840 is disposed so as to partially cover the side surface of the electrode support 830. Specifically, the anode 840 covers one of the paired parallel flat surfaces of the electrode support 830 and two curved surfaces thereof connecting the ends of the flat surfaces. The electrolyte layer 850 is disposed so as to cover the entire side surface of the anode 840. The cathode 860 is disposed so as to cover a region of the side surface of the electrolyte layer 850, the region being located on the flat surface of the electrode support 830. The intermediate layer 900 is disposed between the electrolyte layer 850 and the cathode 860. A solid solution layer (not shown) formed through interdiffusion between the intermediate layer 900 and the electrolyte layer 850 is present between the intermediate layer 900 and the electrolyte layer 850. The interconnector 810 is disposed on the flat surface of the electrode support 830 on which the anode 840 and the electrolyte layer 850 are not disposed. Each current collecting member 870 electrically connects the cathode 860 of one electricity generation unit 102a to the interconnector 810 of another adjacent electricity generation unit 102a. An oxidizer gas is supplied to the outside of the cathode 860, and a fuel gas is supplied to the fuel gas flow channels 820 formed in the electrode support 830. Electricity is generated in the fuel cell stack 100a when it is heated to a predetermined operation temperature.

In the fuel cell stack 100a having the aforementioned configuration, the interface contact ratio Rc preferably falls within a range of 25.5% to 68.6% in at least one single cell 110a as in the case of the above embodiment, since impairment of the electricity generation performance of the single cell 110a can be prevented. The interface contact ratio Rc more preferably falls within a range of 30.0% to 64.1%, since impairment of the electricity generation performance of the single cell 110a can be effectively prevented. The interface contact ratio Rc still more preferably falls within a range of 36.4% to 57.8%, since impairment of the electricity generation performance of the single cell 110a can be more effectively prevented.

The above embodiment refers to an SOFC for generating electricity by utilizing the electrochemical reaction between hydrogen contained in a fuel gas and oxygen contained in an oxidizer gas; however, the present invention is also applicable to an electrolysis single cell which is the constitutive unit of a solid oxide electrolysis cell (SOEC) for generating hydrogen by utilizing the electrolysis of water, and to an electrolysis cell stack including a plurality of electrolysis single cells. Since the structure of the electrolysis cell stack is publicly known as described in, for example, Japanese Patent Application Laid-Open (kokai) No. 2016-81813, detailed description of the structure is omitted. Schematically, the electrolysis cell stack has a structure similar to that of the fuel cell stack 100 in the above embodiment. That is, the fuel cell stack 100 in the above embodiment may be read as "electrolysis cell stack," the electricity generation unit 102 may be read as "electrolysis cell unit," and the single cell 110 may be read as "electrolysis single cell." However, in operation of the electrolysis cell stack, voltage is applied between the cathode 114 and the anode 116 such that the cathode 114 serves as a positive electrode, whereas the anode 116 serves as a negative electrode, and water vapor is supplied as a material gas through the communication hole 108. Thus, the electrolysis of water occurs in the electrolysis cell units, whereby hydrogen gas is generated in the anode chambers 176, and hydrogen is discharged to the outside of the electrolysis cell stack through the communication hole 108. In the electrolysis single cell and the electrolysis cell stack having the aforementioned configuration, if an intermediate layer is disposed between the electrolyte layer and the cathode, and the interface contact ratio Rc is adjusted to fall within a range of 25.5% to 68.6% as in the case of the above embodiment, the performance impairment of the single cell can be prevented. If the interface contact ratio Rc is adjusted to fall within a range of 30.0% to 64.1%, the performance impairment of the single cell can be effectively prevented. If the interface contact ratio Rc is adjusted to fall within a range of 36.4% to 57.8%, the performance impairment of the single cell can be more effectively prevented.

The above embodiment is described while referring to the solid oxide fuel cell (SOFC); however, the present invention is also applicable to other types of fuel cell (or electrolysis cell), such as a molten carbonate fuel cell (MCFC).

DESCRIPTION OF REFERENCE NUMERALS

22: bolt, 24: nut; 26: insulation sheet; 27: gas passage member; 28: body portion; 29: branch portion; 100: fuel cell stack; 102: electricity generation unit; 104: end plate; 106: end plate; 108: communication hole; 110: single cell; 112: electrolyte layer; 114: cathode; 116: anode; 120: separator; 121: hole; 124: bonding member; 130: cathode-side frame; 131: hole; 132: oxidizer gas supply communication hole; 133: oxidizer gas discharge communication hole; 134: cathode-side current collector; 135: current collector element; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 166: cathode chamber; 171: fuel gas introduction manifold; 172: fuel gas discharge manifold; 176: anode chamber; 180: intermediate layer; 182: solid solution layer; 210: active layer; 220: current collecting layer; 810: interconnector; 820: fuel gas flow channel; 830: electrode support; 840: anode; 850: electrolyte layer; 860: cathode; 870: current collecting member; and 900: intermediate layer

The invention claimed is:

1. An electrochemical single cell comprising an electrolyte layer containing Zr and at least one of Y, Sc, and Ca, an anode disposed on one side of the electrolyte layer in a first direction, a cathode containing Sr and Co and disposed on the other side of the electrolyte layer in the first direction, and an intermediate layer disposed between the electrolyte layer and the cathode, the electrochemical single cell being characterized by exhibiting an interface contact ratio of 25.5% to 68.6% in at least one cross section parallel to the first direction, wherein the interface contact ratio is the ratio of the sum of the lengths of portions containing neither $SrZrO_3$ nor cavities of an interfacial surface of the intermediate layer on the electrolyte layer side to the total length of the interfacial surface, and wherein the intermediate layer contains at least one selected from the group consisting of gadolinium-doped ceria (GDC) and samarium-doped ceria (SDC) and at least one selected from the group consisting of yttria-stabilized zirconia (YSZ), scandia-stabilized zirconia (ScSZ) and calcium oxide-stabilized zirconia (CaSZ).

2. An electrochemical single cell according to claim 1, wherein the interface contact ratio is 30.0% to 64.1% in at least one cross section parallel to the first direction.

3. An electrochemical single cell according to claim 1, wherein the interface contact ratio is 36.4% to 57.8% in at least one cross section parallel to the first direction.

4. An electrochemical single cell according to claim 1, the electrochemical single cell exhibiting a maximum interface contact length of 0.3 µm or more in at least one cross section parallel to the first direction in each of three portions of the electrochemical single cell, the three portions being prepared by virtually dividing the electrochemical single cell so that the cathode is equally divided into three parts in a predetermined direction as viewed in the first direction, wherein the maximum interface contact length is the maximum of the lengths of portions containing neither $SrZrO_3$ nor cavities of the interfacial surface of the intermediate layer on the electrolyte layer side.

5. An electrochemical single cell according to claim 4, wherein the maximum interface contact length is 0.7 µm or more in at least one cross section parallel to the first direction in each of the three portions of the electrochemical single cell.

6. An electrochemical single cell according to claim 4, wherein the maximum interface contact length is 1.0 µm or more in at least one cross section parallel to the first direction in each of the three portions of the electrochemical single cell.

7. An electrochemical single cell according to claim 1, wherein the electrolyte layer contains a solid oxide.

8. An electrochemical single cell according to claim 1, wherein the electrochemical single cell is a fuel cell single cell.

9. An electrochemical cell stack comprising a plurality of electrochemical single cells disposed in a first direction, the electrochemical cell stack being characterized in that at least one of the electrochemical single cells is an electrochemical reaction single cell as recited in claim 1.

10. An electrochemical single cell according to claim 1, wherein the intermediate layer contains GDC and YSZ.

* * * * *